Oct. 11, 1960 S. J. GUT 2,955,480

DEVICE FOR ADJUSTING ROTATIONAL ANGULAR RELATION
BETWEEN TWO CONCENTRIC SHAFTS

Filed Oct. 31, 1958 7 Sheets-Sheet 1

INVENTOR.
STANLEY J. GUT

BY

ATTORNEYS

Oct. 11, 1960 S. J. GUT 2,955,480

DEVICE FOR ADJUSTING ROTATIONAL ANGULAR RELATION BETWEEN TWO CONCENTRIC SHAFTS

Filed Oct. 31, 1958 7 Sheets-Sheet 2

STANLEY J. GUT
*INVENTOR.*

BY

ATTORNEYS

STANLEY J. GUT
INVENTOR.
BY [signature]
ATTORNEYS

INVENTOR.
STANLEY J. GUT
BY
ATTORNEYS

DEVICE FOR ADJUSTING ROTATIONAL ANGULAR RELATION BETWEEN TWO CONCENTRIC SHAFTS

Filed Oct. 31, 1958 7 Sheets-Sheet 5

STANLEY J. GUT
INVENTOR.
BY
ATTORNEYS

Oct. 11, 1960 S. J. GUT 2,955,480

DEVICE FOR ADJUSTING ROTATIONAL ANGULAR RELATION BETWEEN TWO CONCENTRIC SHAFTS

Filed Oct. 31, 1958 7 Sheets-Sheet 6

STANLEY J. GUT
*INVENTOR.*

BY [signature]

ATTORNEYS

STANLEY J. GUT
*INVENTOR.*

BY

ATTORNEYS

United States Patent Office 2,955,480

Patented Oct. 11, 1960

2,955,480

DEVICE FOR ADJUSTING ROTATIONAL ANGULAR RELATION BETWEEN TWO CONCENTRIC SHAFTS

Stanley J. Gut, Packanack Lake, N.J., assignor to General Precision, Inc., a corporation of Delaware Filed Oct. 31, 1958, Ser. No. 771,026

9 Claims. (Cl. 74—395)

This invention relates to a compensating and adjustment device, and is primarily directed to a device for adjusting the rotational angular relation between two concentrically mounted rotatable shafts.

The primary feature of the invention is that the angular relation between one of the shafts, which is cylindrical, and concentric with an outer tubular shaft, is adjustable, provision being made for adjusting the relative angular position of the central cylindrical shaft which serves as the output shaft, relative to the outer tubular or input shaft, at uniform angular increments around the circumference of the tubular shaft.

Another feature of the invention is that means is provided to indicate on a dial the angular position of the tubular outer or input shaft at any point during its rotation, and further provision is made for indicating, by means of a vernier, the adjusted angular position of the central output shaft, relative to the tubular outer or input shaft, the vernier showing the adjusted angular relation at each angular adjusting position of the central cylindrical or input shaft, relative to the tubular outer shaft.

Another feature of the invention is that the entire compensating and adjustment device, is sealed, the rotation of the flexible control member, which controls the angular adjustment of the central cylindrical or output shaft relative to the tubular outer shaft, being effected through a Hermeflex transmission unit, which consists of a rotational angle adjustment mechanism, which is enclosed in a sealed tubular bellows, rotating the bellows to control the adjusted rotational angular position of the driven shaft of the Hermeflex transmission unit, by means of a control handle attached to a drive shaft mounted at the outer end of the Hermeflex unit, the bellows compensating for any angular variations between the drive and the driven shafts of the Hermeflex transmission unit.

Another feature of the construction is that an additional tubular bellows is provided, around the Hermeflex unit, to enable a control pinion attached to the driven shaft of the Hermeflex unit, which is utilized as a means for driving a planetary gear train, which is provided to elevate and lower an adjusting screw, which raises and lowers a section of a relatively thin diaphragm or cam, which is in turn used for transmitting the rotational angular variations between the central cylindrical or output shaft and the tubular outer or input shaft, to the indicating mechanism, at various angular positions during the rotation of the tubular outer, or input shaft of the apparatus.

A thin annular flexible diaphragm mounted in engagement with the adjusting screws, is utilized to transmit by means of a system of levers, the adjusted angular relation of the central cylindrical, or output shaft, relative to the tubular outer or input shaft, at various angular positions during the rotation of the tubular outer or input shaft.

A plurality of externally threaded adjusting screws is provided at equal angular increments around the mean circumference of the adjustment or cam diaphragm, the adjusting screws being selectively adjusted longitudinally by means of an internally threaded pinion fitted to each of the adjusting screws, the pinion being selectively rotated by means of a planetary gear train, which is in turn controlled by a pinion attached to the output shaft of the Hermeflex transmission unit, to selectively elevate and lower the corresponding section of the flexible diaphragm in order to control the angular position of the central cylindrical or output shaft relative to the tubular input shaft.

A major feature of the unit is that it is small, compact, sealed to prevent exposure to atmospheric conditions, and accurately controllable at uniform angular increments around the flexible adjusting diaphragm.

The angular variations of the central cylindrical or output shaft, relative to the tubular outer or input shaft, are made at small angular increments, the angular increments being indicated on a vernier scale, which is mounted in the form of a small circular sector, which is used in conjunction with a graduated circular dial member, which indicates the various angular adjustment positions around the flexible circular diaphragm.

The accompanying drawings, illustrative of one embodiment of the invention, together with the description of its construction and the method of operation and utilization thereof, will serve to clarify further objects and advantages of the invention.

In the drawings:

Figure 1 is a vertical section through the assembled cam compensator and vernier unit, showing the relatively angularly adjustable central cylindrical output shaft, the tubular input shaft surrounding the central output shaft, the adjustable cam diaphragm, and the linkage controlled by the variations in the position of the flexible cam diaphragm, to transmit the adjusted position of portions of the flexible cam diaphragm at various rotational angular positions of the tubular outer shaft to the central cylindrical shaft, the adjusting screws provided to elevate and lower individual sections of the flexible cam diaphragm, the planetary gear train utilized to rotate the pinion fitted to each diaphragm adjusting screw at the selected radial position, a control pinion mounted on the output shaf[t] of a Hermeflex transmission unit, the control pinion bein[g] selectively meshed with one of a pair of control gears one of which is utilized to elevate and lower a selecte[d] adjusting screw, the other control gear being utilize[d] to rotate a rotatable planetary support disc, which ro[tates] a planetary gear train which is supported by th[e] planetary support disc, into a position in which the plane[tary] gear train selectively meshes with a selected adjus[t]ing screw pinion, the internally threaded tubular hu[b] of which is threadably fitted to one of the adjustin[g] screws.

Figure 2 is a plan view of a portion of the cam con[]pensator and vernier mechanism shown in Figure 1, sho[w]ing the housing, the cap, which surrounds and cove[rs] the Hermeflex tranmission unit and the bellows surroun[d]ing it, the housing cover and the window fitted to t[he] housing cover through which the circular graduati[on] scale, and the graduation scale on the vernier indicat[ing] sector, mounted adjacent the circular graduation sca[le] may be read.

Figure 3 is a vertical section, similar to Figure [1] through the assembled cam compensator and vern[ier] mechanism, shown in Figure 1 with the Hermeflex tra[ns]mission unit and the driving and driven shafts attac[h]ed thereto elevated by means of a control handle wh[ich] is attached to the drive shaft thereof, so that the pin[ion] which is attached to the lower end of the driven sh[aft] of the Hermeflex unit, engages and meshes with an up[per] central control gear, which enables the planetary s port disc, by means of which the planetary pinions, shown in Figure 1, are supported, to be rotated into another angular adjustment position, similar to that shown in Figure 1, to enable the pinion fitted to another adjusting screw to adjust the vertical position of the flexible cam diaphragm shown in Figure 1.

Figure 4 is a partial cross-section and partial plan view of the upper portion of the cam compensator and vernier mechanism, shown in Figure 1, showing the graduated circular dial indicating the angular positions around the circumference of the dial casing and the flexible circular cam diaphragm, the angularly adjustable vernier sector, and the shaft supporting the vernier indicator sector, the outer circumferential portion of the vernier indicator sector being graduated to show the adjusted angular position of the central cylindrical or output shaft relative to the tubular outer or input shaft, the section being taken on the line 4—4, Figure 1.

Figure 5 is a partial cross-section and partial plan view, similar to Figure 4, through the housing of the cam compensator shown in Figure 1, showing a series of adjusting screws located at equal angular increments around the inner circumference of the housing, and the spanner nuts fitted to each of the adjusting screws. The control pinion attached to the driven shaft of the Hermeflex transmission unit is also shown, as well as a series of frusto-conical radially positioned seats formed in the base of a bracket attached to an inner dial casing, shown in Figure 1, which selectively receive the frusto-conical lower end of the driven shaft of the Hermeflex transmission unit, and locate the planetary gears relative to the individual pinion surrounding each adjusting screw. The gears in the planetary gear train are also shown, the frusto-conical seats being equally spaced and radially positioned about the center of the base plate of the bracket, to coordinate the radial position of the control pinion with the selected adjusting screw, corresponding to the location of the selected frusto-conical seat in which the driven shaft of the Hermeflex transmission unit is located, the section being taken on the line 5—5, Figure 1.

Figure 6 is a cross-section through the central output shaft and the tubular input shaft of the cam compensator unit shown in Figure 1, showing a pin fitted through the center of the central output shaft, the pin fitting through a pair of diametrically aligned slots through the tubular input shaft, which receive and engage the central pin to limit the range of angular adjustment of the central cylindrical output shaft relative to the tubular input shaft, the section being taken on the line 6—6, Figure 1.

Figure 7 is a cross-section through the upper extension of the tubular input shaft shown in Figure 1, and the yoke end transmission lever pivotally supported by the tubular input shaft, the pivoted transmission lever having a follower roller trunnioned on the outer end thereof, the follower roller engaging the lower face of the circular flexible cam diaphragm to transmit through the pivoted transmission lever, the adjusted position of the adjacent portion of the flexible cam diaphragm, the section being taken on the line 7—7, Figure 1.

Figure 8 is a cross-section through a pivoted auxiliary lever of the linkage shown in Figure 1, to transmit the adjusted position of the flexible cam diaphragm, shown in Figure 1, to the vernier sector shown adjacent the upper end of Figure 1, showing the yoke arms integral with the upper end of the tubular input shaft, which pivotally support the auxiliary lever, the section being taken on the line 8—8, Figure 1.

Figure 9 is a vertical section through one arm of the pivoted yoke end transmission lever, shown in Figure 7, and a front elevation of the upper end of the tubular input shaft, shown in Figure 1, showing the pin fixedly attached to one arm of the yoke of the transmission lever, which is utilized to convert the angular movement of the yoke end transmission lever as transmitted from the flexible cam diaphragm, to rotational adjustment of the central cylindrical output shaft, relative to the tubular input shaft, the section being taken on the line 9—9, Figure 7.

Figure 10 is a vertical section, similar to Figure 9, through one arm of the pivoted yoke end of the transmission lever shown in Figures 1 and 9, showing the cam follower roller trunnioned on the free end of the transmission lever, elevated from the position shown in Figure 9, in engagement with the adjusted position of the adjacent portion of the cam diaphragm, and the pin attached to the central cylindrical shaft rotated through a corresponding angular adjustment, by means of the pin attached to the yoke end of the transmission lever, the section being taken on the line 9—9, Figure 7.

Figure 11 is a front elevational view of the yoke at the upper end of the tubular input shaft, shown in Figures 1 and 8, and the auxiliary lever pivotally attached thereto, showing the pivoted link which operatively connects one end of the auxiliary lever with the free end of the yoke end transmission lever, the view being taken on the line 11—11, Figure 8.

Figure 12 is a plan view of a narrow gear sector rotatably supported by a pair of plates mounted adjacent the upper end of the housing shown in Figure 1, as shown in Figure 13, the gear sector having a cylindrical pin through the center thereof, which engages a pin attached to a short pivoted lever shown in Figure 1, to angularly adjust the gear sector, the view being taken on the line 12—12, Figure 13.

Figure 1:
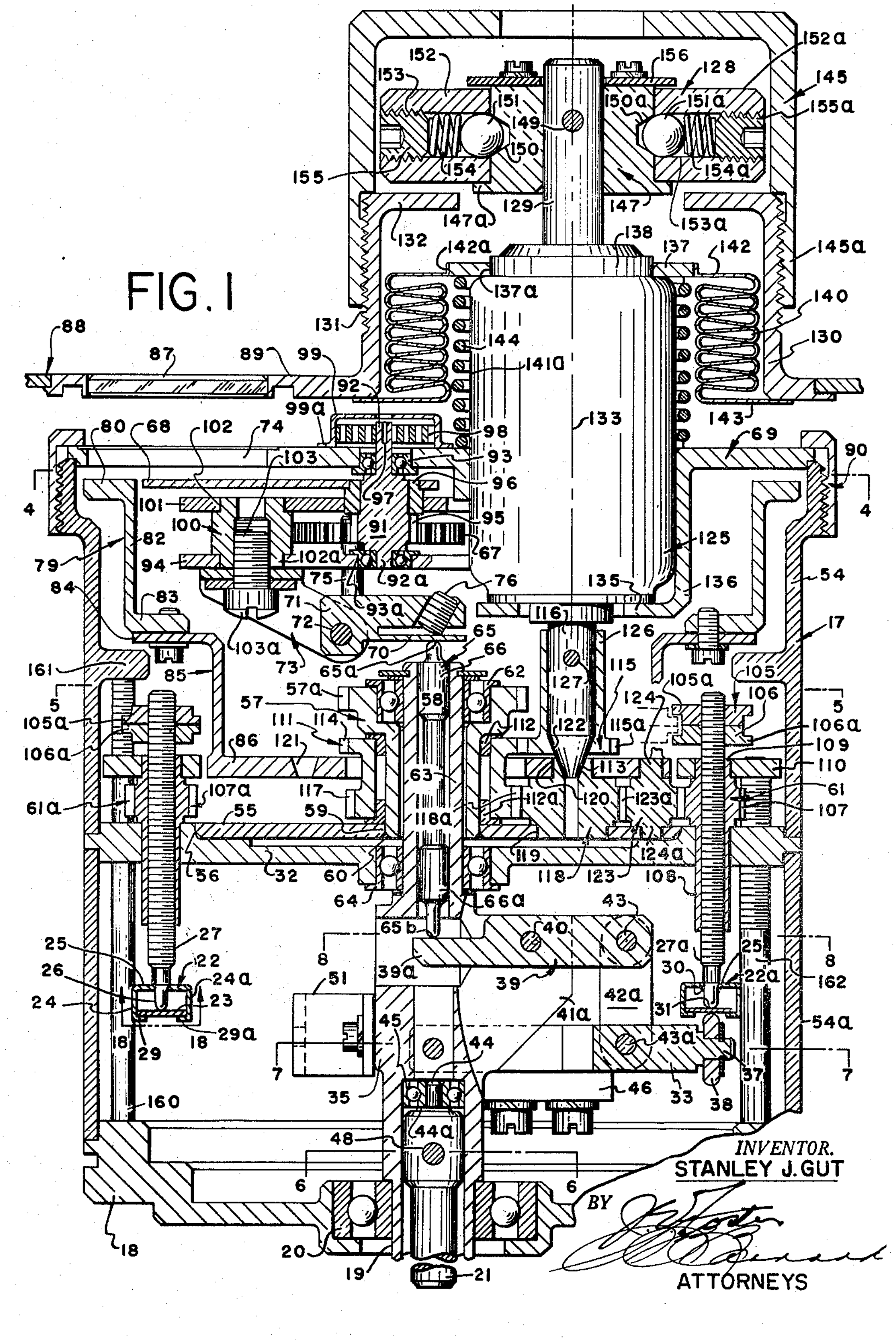
Figure 7:
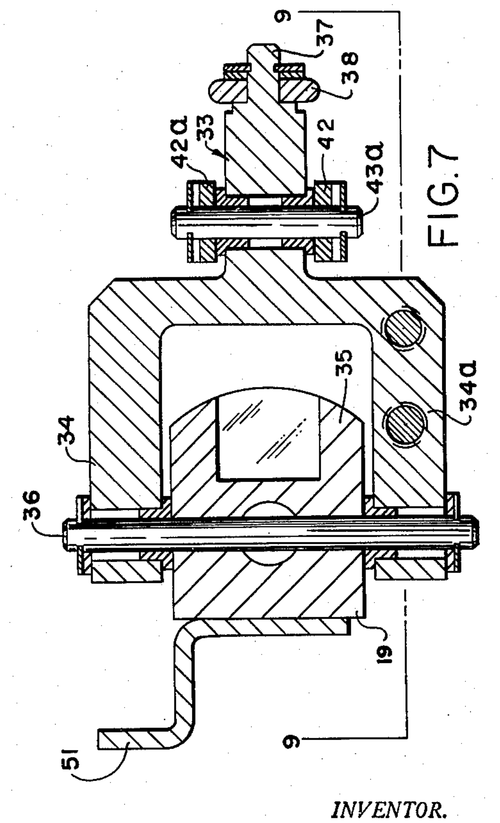
Figure 15:
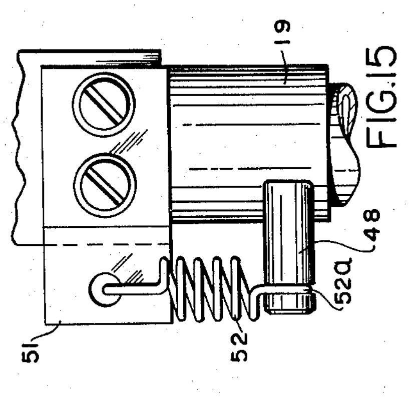
Figure 9:
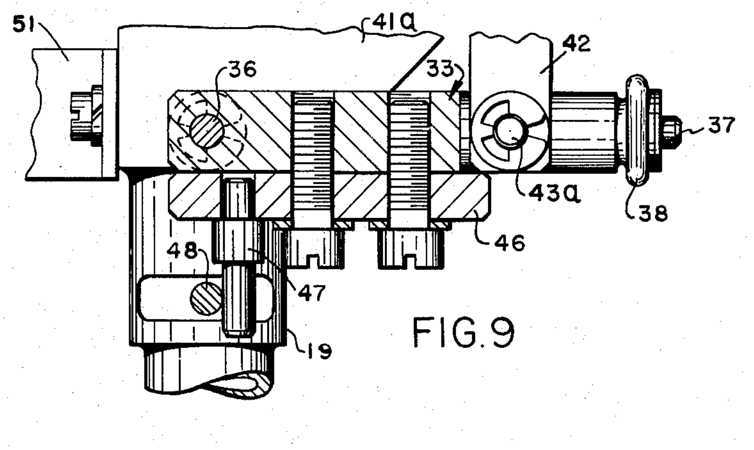
Figure 10:
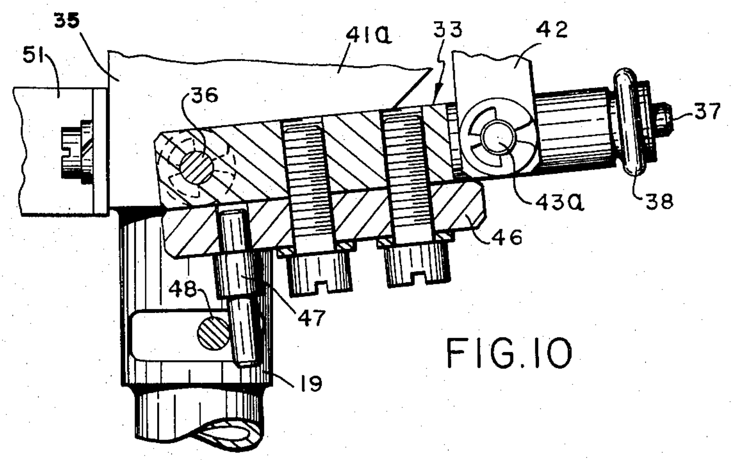
Figure 14:
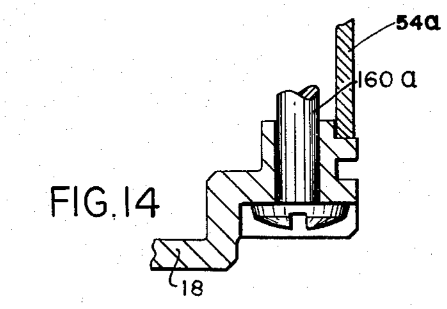
Figure 14 is a vertical section through a portion of the lower section of the housing shown in Figure 1, showing one of the screws used to connect the upper and lower sections of the housings and the cover attached to the lower section of the housing, as shown in Figure 1, the section being taken on the line 14—14, Figure 5.

Figure 15 is a left-hand side elevational view of the upper end of the tubular input shaft and a pin inserted through and attached to the central output shaft, as shown in Figures 7 and 9, showing a spring support bracket and a coiled tension spring connecting the support bracket to the pin, to maintain the pin which is inserted through the cylindrical output shaft in continuous engagement with the nominally substantially vertical pin shown in Figures 1, 9 and 10.

Figure 2:
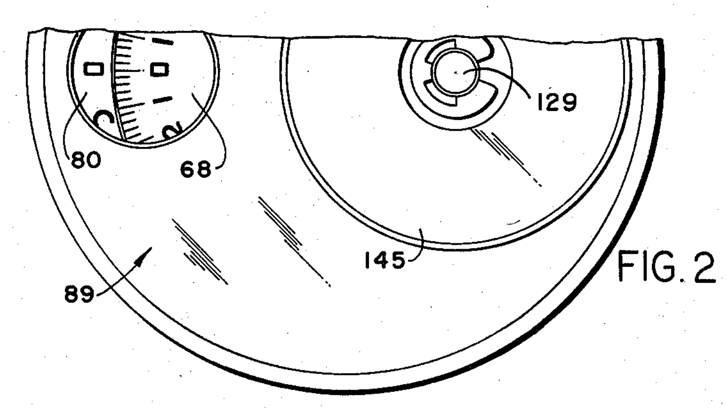
Figure 16:
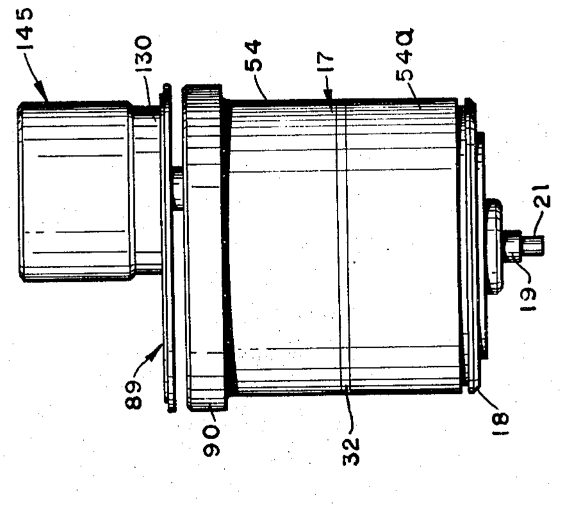

Figure 16 is a full size front elevation of the cam compensator and vernier mechanism shown in Figures 1 and 2.

Figure 17:
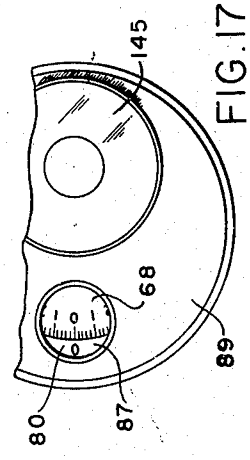

Figure 17 is a partial full size plan view of the assembled cam compensator and vernier mechanism shown in Figures 1 and 16.

Figures 18, 19:
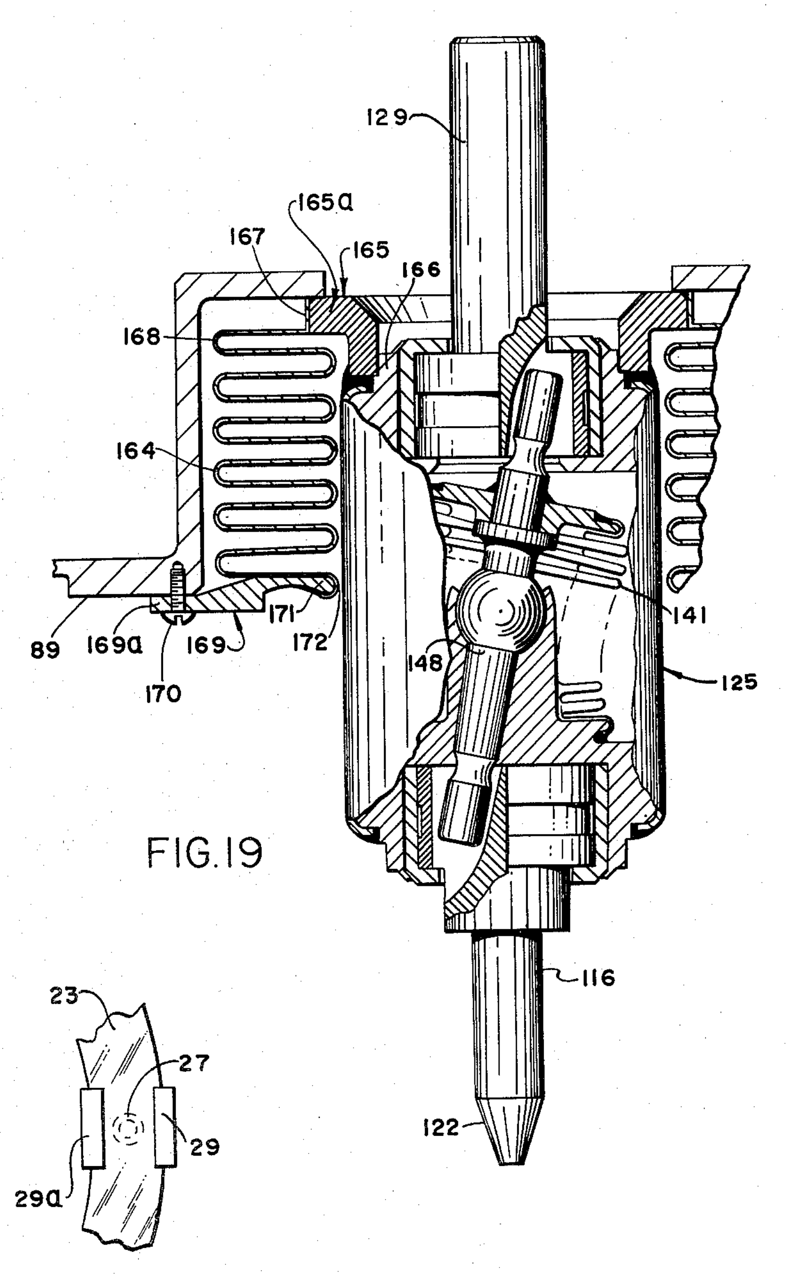

Figure 18 is a bottom plan view of a portion of the flexible cam diaphragm, and one of the channels supporting the flexible cam diaphragm, the view being taken on the line 18—18, Figure 1.

Figure 19 is a vertical section, similar to Figure 1, through a modification of a portion of the assembled cam compensator and vernier shown in Figure 1, including a modification of the tubular bellows, shown in Figure 1, showing an adapter ring provided for attaching one end of the modified tubular bellows to the Hermeflex assembly, the method of attaching the adapter ring to the tubular bellows and the Hermeflex transmission unit, a circular flange attached to the lower end of the tubular bellows, the method of attaching the circular flange to the adjacent convolution of the tubular bellows, and the method of attaching the flange to the upper cover of the cam compensator assembly, shown in Figure 1.

*General*

The unit has two concentric shafts located at and projecting through the bottom of a cover attached to the case, one, the output shaft being substantially cylindrical and located on the vertical centerline of the case, the second, the input shaft being substantially tubular and surrounding the central output shaft.

The central, or output shaft is rotatably angularly adjustable relative to the tubular outer, or input shaft, under control of a large relatively thin flexible annular diaphragm, which although normally flat, has a series of waves or undulations formed therein, by means of a series of twenty-four, or other predetermined number of externally threaded adjusting screws, which are located substantially equally spaced radially, approximately midway between the inner and outer circumferences of the flexible diaphragm, each adjusting screw having a reduced diameter substantially hemispherical tip, which engages the upper surface of the flexible diaphragm, located at the lower end thereof, the hemispherical tip being located in substantial alignment with the mean circumference of the flexible diaphragm, between the inner and outer circumferences thereof, the adjusting screws being substantially perpendicular to the flexible diaphragm in its nominal flat position.

A circular roller follower which engages the lower surface of the flexible diaphragm, opposite the adjusting screws, is rotatably supported by a long lever pivotally supported by a pin inserted through the upper portion of the tubular input shaft.

The long pivoted lever is retained in its vertically adjusted position, so that the roller follower is always in engagement with the bottom surface of the flexible diaphragm, by a tension spring inserted between a bracket attached to the tubular outer shaft, and a long cylindrical pin inserted through the central cylindrical shaft.

A shorter pivoted arm is pivotally supported by a yoke integral with the tubular outer shaft, the shorter pivoted arm being located above and substantially parallel to the long pivoted lever.

A short link connects the upper pivoted arm and the lower pivoted lever, so that the angular movement of the outer end of the long pivoted lever, which supports the follower roller, which engages the bottom surface of the flexible diaphragm, to transmit the relative position of sections thereof to the central cylindrical shaft, is transmitted to the short upper arm.

Figure 3:
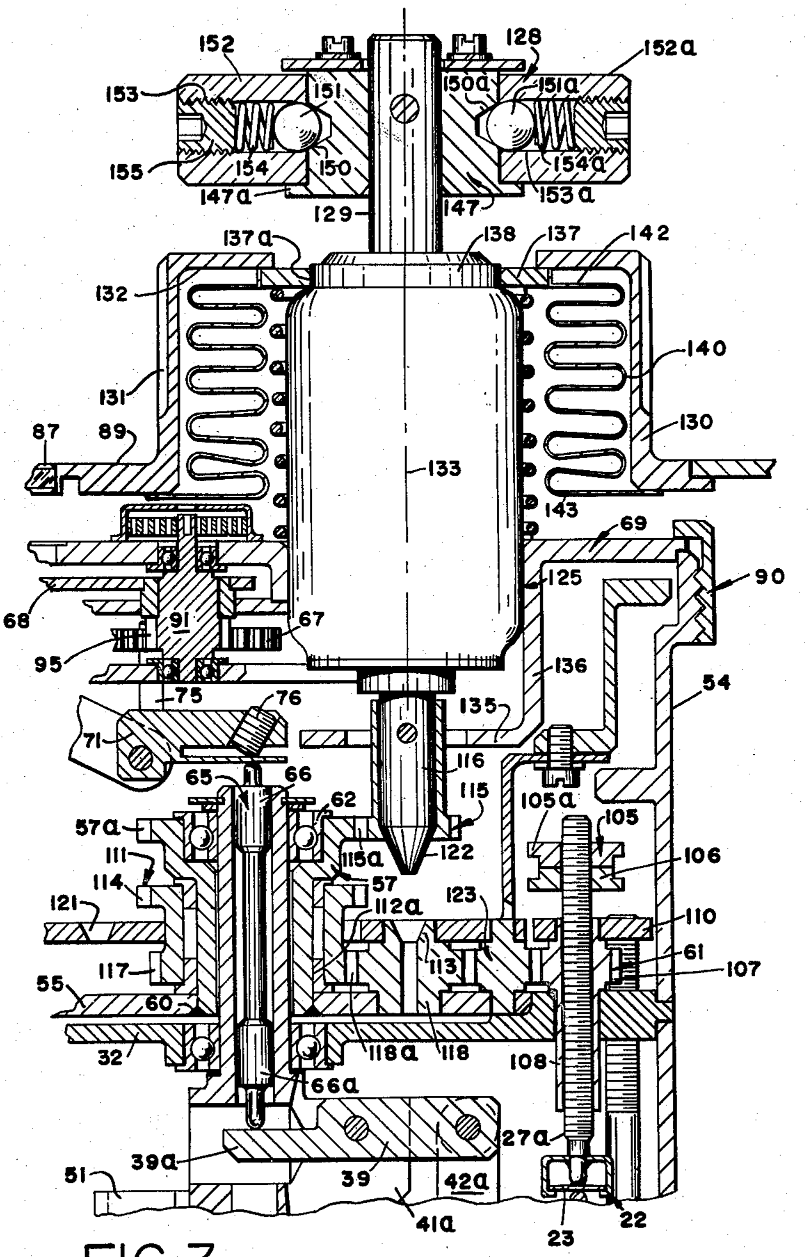

When a section of the flexible diaphragm is elevated from the mean position shown in Figure 1, to one of the adjusting positions shown in Figures 3 and 10, the pivoted lever attached to the tubular input shaft follows the movement of the flexible diaphragm, in order to maintain continuous contact between the roller follower attached to the pivoted lever and the bottom of the flexible diaphragm.

A plate attached to the long pivoted lever at the bottom surface thereof, adjacent the pivot point, has a cylindrical pin attached thereto and depending therefrom, the cylindrical pin being substantially perpendicular to the plate.

Figure 6:
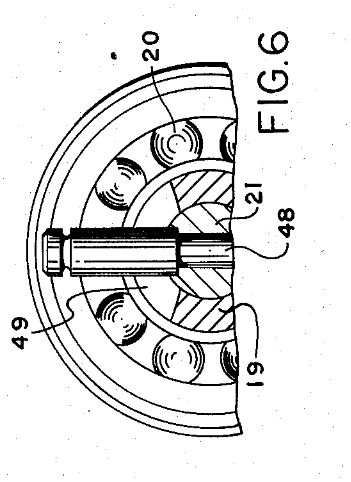

Another cylindrical pin which is pressed through the center of the central solid cylindrical output shaft, as shown in Figure 1 and in section in Figure 6, the ends of the long cylindrical pin, which pass through a pair of radially positioned slots through the tubular outer shaft, engaging the outer surface of the pin attached to the long pivoted lever. A coiled tension spring, one end of which is attached to a bracket attached to the tubular outer shaft, with a loop at the opposite end of the tension spring wrapped around the projecting end of the long cylindrical pin, through the central output shaft, thereby maintaining the pin through the central output shaft in continuous engagement with the pin attached to and depending from the plate attached to the long pivoted lever, as shown in Figures 9 and 15, and in that manner maintaining the adjusted relation between the central output shaft, and the tubular input shaft at all times.

In this manner, the central cylindrical, or output shaft is rotated through an angle relative to the tubular input shaft, thus providing a rotational angular adjustment between the concentric input and output shafts.

A long pin reciprocatively mounted in a tubular central extension of the tubular outer shaft, which is located in axial alignment with and integral with the tubular output shaft, is provided to transmit the angular position of the pivoted upper arm to a gear sector and through the gear sector to a vernier indicator sector located adjacent the upper end of the cam compensator unit, in a manner hereinafter described in greater detail.

The lower end of the reciprocating pin, which is hemispherical in contour, or of other arcuate cross-sectional contour, engages a ledge at the inner end of the short pivoted arm, located substantially at the vertical centerline of the cam compensator unit.

The upper substantially hemispherical end of the central reciprocating pin engages a short cantilever diaphragm, which is integral with the lower end of a short pivoted arm, which is pivotally supported by a short bracket located at the left-hand side of the unit.

An angularly positioned headless adjusting screw, fitted to the upper portion of the short pivoted arm, is provided to manually adjust the vertical position of the free, or outer end of the cantilever diaphragm, relative to the short pivoted arm, thereby adjusting the cantilever diaphragm to the vertical position of the central reciprocating pin.

A circular dial, circumferentially graduated over a range of 360°, is located adjacent the upper end of the main housing of the unit, the circular dial being supported by a bracket, which is spacedly located relative to and attached to a planetary support disc, which is rotatably fitted to a separator plate mounted between the two housing sections of the outer housing.

In conjunction with the circular dial, an adjustment vernier indicator sector, graduated over a range of 5° from either side of the center thereof, is provided, the vernier indicator sector being supported by the upper end of a vertical shaft, which is in turn supported by a pair of ball bearings, one of which is fitted to an inner cover attached to the upper housing section, the other bearing being fitted to a plate attached to the upper housing section.

An outer cover having a transparent plastic covered opening therethrough, is mounted above the circular dial, the outer cover having a central neck of hollow substantially circular cross-section integral therewith, the outer portion of the central neck being threaded, the vertical centerline of the circular central neck being radially offset relative to the centerline of the main housing.

A set of tubular bellows of circular cross-section is provided in the interior of the tubular central neck of the outer cover, the bottom annular flange of the tubular bellows, which is integral with the convolutions thereof, being attached to the bottom surface of the outer cover.

A thin circular rim integral with the convolutions at the upper end of tubular bellows, is attached to the lower face of a small circular plate which is in turn fitted to a pilot located at the upper end of a substantially cylindrical Hermeflex unit, which is mounted on the longitudinal centerline of the central neck section of the outer cover.

A coiled compression spring of circular cross-section surrounds the upper portion of the Hermeflex unit, the compression spring being supported between the top of the inner cover and the bottom of the small centering plate which is attached to the top of the cylindrical section of the Hermeflex transmission unit, to maintain the required tension in the convolutions of the bellows.

In order to adjust the vertical position of any of the radially positioned adjusting screws, which control the adjusted vertical position of any of the adjustment tips at the lower end of each of the adjusting screws, which in turn regulate the relative height of the individual sections of the flexible diaphragm, at its various radial adjustment points, a cap located at the upper end of the cam compensator unit, is removed from the threaded tubular neck, thereby exposing the control handle which is manually elevated, thus raising the Hermeflex transmission unit attached to the control handle, until the tubular pinion attached to the lower or driven shaft of the Hermeflex transmission unit engages the upper gear of a pair of central planetary drive gears mounted in the housing, co-axially with the cencentric central shafts, as shown in Figure 1.

The manually controlled lifting and control handle and the upper drive shaft of the Hermeflex transmission unit attached thereto, are rotated until the tubular screw adjustment pinion, which is threadably fitted to the adjusting screw located at the angular position required for adjusting the adjacent portion of the cam diaphragm, is in meshing alignment with the planetary adjustment gears, shown in Figure 1.

In this position, the control handle, with the upper drive shaft of the Hermeflex transmission unit attached thereto, is again lowered to the position shown in Figure 1.

The control handle is then rotated in the required direction to elevate or lower the selected adjusting screw to the required adjusted position of the circular flexible diaphragm at that point.

Figure 4:
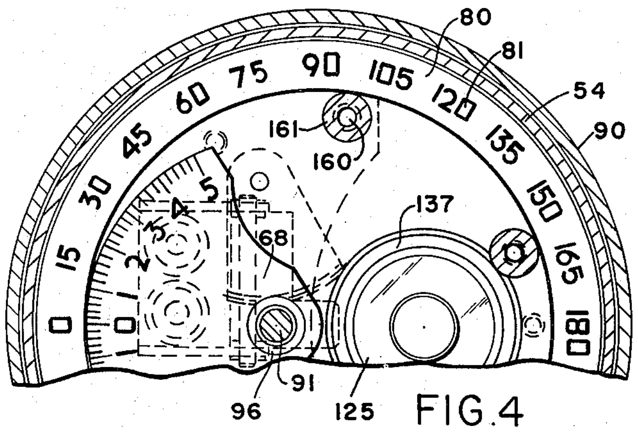

When the planetary adjustment gear train is moved to the radial position required, the indicator sector shown in Figure 4 is simultaneously radially displaced about its center until the rotational angular position of the indicator sector corresponds with the displacement of the flexible diaphragm and consequently the rotational angular displacement of the central cylindrical shaft, relative to the tubular outer shaft, at the angular position aligned with the angular designation of the dial corresponding with the angular position of the selected adjusting screw.

The figures and the graduations engraved on the vernier indicator sector indicate the variation in angular position between the driving and driven shafts at the bottom of the cam compensator unit at the corresponding adjustment point on the flexible diaphragm.

After that the control handle and the Hermeflex transmission unit are again elevated, so that the gear attached to the driven Hermeflex shaft is in alignment with the upper central gear. This enables the control handle to again rotate the central cylindrical shaft until another adjustment screw pinion is in alignment with the planetary drive gear, the indicating vernier sector at the top being simultaneously moved through an angle so that its relation with the main circular indicator dial coincides with the angular position of the selected adjusting screw relative to the horizontal axis of the unit shown in Figure 4.

It will be understood that the foregoing general description and the following detailed description of the construction and the method of operation and utilization of the apparatus for varying the angular relation between concentric shafts is intended as explanatory of the invention and not restrictive thereof.

In the drawings, the same reference numerals designate the same parts throughout the various views, except where otherwise indicated.

One embodiment of the construction shown in Figures 1, 2 and 3, is mounted in a tubular housing 17, having a circular cover 18 attached to the lower end thereof.

A pair of concentric shafts, consisting of a tubular input shaft 19, which is trunnioned in a ball bearing 20 fitted to the center of the cover 18, and a substantially cylindrical inner, or output shaft 21, trunnioned in the tubular input shaft, is mounted in the lower portion of the housing 17, co-axially therewith, the shafts projecting beyond the lower end of the cover 18.

A plurality of radially positioned diaphragm support channels 22 of hollow substantially rectangular cross-section are circumferentially located in the interior of the housing, the diaphragm support channels 22, **22*a* supporting an annular cam plate, or diaphragm 23 made of thin flexible sheet metal, which is slidably mounted between the side walls 24, 24*a* of the diaphragm support channels. The upper wall 25 of each of the diaphragm support channels, which has a central opening therethrough, is fixedly attached to and supported by the reduced diameter cylindrical section 26 of an externally threaded adjusting screw 27, 27*a*, such as those shown in Figure 1, the adjusting screws 27, 27*a* which are radially positioned, inside the inner surface of the circumferential wall of the housing 17, in the relative positions shown in Figure 5, the adjusting screws 27, 27*a* being located substantially parallel to the longitudinal axis of the housing 17, each adjusting screw being vertically adjustable to elevate or lower the adjacent portion of the flexible diaphragm 23** in the manner shown in Figures 1 and 3, hereinafter described in greater detail.

The side walls 24, **24*a* of each of the diaphragm support channels 22, 22*a* are bent inward to form a pair of bottom walls 29, 29*a*, which are substantially parallel to the upper wall 25 of the individual diaphragm support channels, the bottom walls 29, 29*a*** of each diaphragm support channel, having a central gap therebetween as shown in Figures 1 and 18.

In assembling the flexible diaphragm to the diaphragm support channels 22, **22*a*, each of the diaphragm support channels 22, 22*a* is formed as an open channel, the bottom walls being extensions of and in alignment with the side walls 24, 24*a* of each of the diaphragm support channels. After each of the diaphragm support channels is attached to the mating adjusting screw, by inserting the reduced diameter cylindrical portion of each adjusting screw through the opening in the upper wall 25 of the corresponding diaphragm support channel, until the upper surface of the upper wall 25 of the diaphragm support channel engages a circular shoulder surrounding the reduced diameter section of the adjusting screw 27, the shoulder serving as a stop to locate the upper wall of the diaphragm support channel relative to the adjusting screw, the inner surface of the upper wall 25 of the diaphragm support channel being brazed 30, soldered, or otherwise fixedly attached to the reduced diameter cylindrical section of the mating adjusting screw 27, 27*a***.

The lower end of the reduced diameter cylindrical section of each adjusting screw, has a tip 31 of semi-circular or other arcuate cross-sectional contour integral therewith, so that when the bottom walls 29, **29*a* of each diaphragm support channel are formed, by bending the side walls 24, 24*a* of the support channel against the lower surface of the flexible diaphragm 23, into the position shown in Figure 1, the flexible diaphragm is positively positioned between the bottom walls 29 and 29*a* of the diaphragm support channel and the tip of the cylindrical section 26** of the corresponding adjusting screw.

The threaded body of each of the adjusting screws 27, **27*a* is fed through a mating opening through the central separator plate 32**, the adjusting screw being supported in a manner hereinafter described in greater detail.

The adjusting screws which are equally spaced circumferentially, around the screw circle, are utilized to adjust the vertical position of the cam plate of flexible diaphragm shown in Figures 1 and 3, the hemispherical lower end of the tip of each of the adjusting screws forming a series of waves or undulations in the cam plate or flexible diaphragm, said undulations being utilized to adjust the angular relation of the cylindrical inner or output shaft, relative to the tubular input shaft, in a manner hereinafter described in greater detail.

The entire bottom surface of the flexible diaphragm 23 is exposed within the case 17, except the area which is supported by the individual diaphragm support channels 22, **22*a*. In these areas, the central section of the flexible diaphragm, which is located above the gap between the bottom wall sections 29, 29*a*** of each diaphragm support channel, is exposed to the control means, which is hereinafter described in greater detail.

Figure 5:
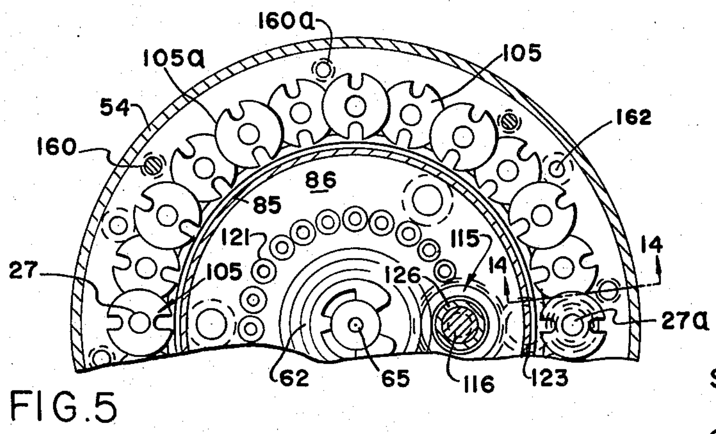

In the construction shown in Figures 1 and 5, a total of twenty-four adjusting screws 27, **27*a***, are equally spaced radially around the inner circumference of the housing, the adjusting screws being located 15° apart, thus providing twenty-four adjusting points for the cam plate, or flexible diaphragm, shown in Figures 1 and 3.

The position of the bottom surface of the cam plate, or flexible diaphragm 23, at each of the adjustment positions thereof, is transmitted to the central cylindrical shaft, through a pivoted lever 33 having a pair of forked arms 34, 34*a* integral therewith, the forked arms straddling and being pivotally attached to a hub 35, located at the upper end of the tubular input shaft, by means of a long pivot pin 36, as shown in Figures 7 and 9, in a manner hereinafter described in greater detail. The forked lever has a short stub shaft 37, of a relatively small diameter, integral with the outer end thereof, a follower roller 38, the outer circumferential surface of which is of semi-circular cross-sectional contour, as shown in Figures 1 and 9, being trunnioned on the stub shaft.

The center of the follower roller 38 is in substantial radial alignment with the center of the cam plate, or flexible diaphragm 23, the outer circumference of the follower roller passing through the gap between the bottom wall sections 29, 29*a* of the diaphragm support channel.

Figure 8:
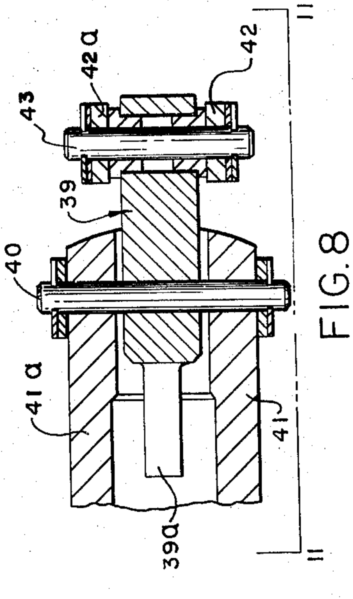
Figure 11:
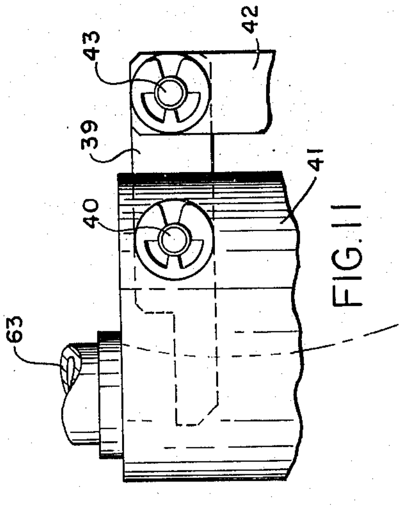

The formed lever 33 is retained in its angularly adjusted position, so that the follower roller is always in engagement with the bottom surface of the cam plate or diaphragm 23, by a coiled tension spring, which is inserted between a bracket attached to the tubular outer shaft, and a long cylindrical pin inserted through the central cylindrical shaft, in a manner hereinafter described. A shorter pivoted arm 39, is located substantially parallel to the forked lever 33, the center of the short pivoted arm 39 being pivotally supported by a pivot pin 40, which is fitted through the arms 41, 41*a* of a yoke integral with the upper end of the tubular input shaft 19 in the manner shown in Figure 1, and in section in Figure 8.

A pair of short connecting links 42, 42*a*, connects the outer end of the short upper pivoted arm 39 with the forked lever 33, the links being supported by a pair of pivot pins 43, 43*a* fitted to the short upper arm and the forked lower lever 33 respectively.

The upper end of the central output shaft 21, has a short cylindrical section 44 of a relatively small diameter integral therewith, the small diameter section 44 being supported by a ball bearing 45, which is fitted to the interior of the tubular input shaft 19, thus enabling the cylindrical output shaft to be rotated relative to the tubular input shaft 19.

The ball bearing 45, which engages a shoulder 44*a* integral with the central output shaft 21, adjacent the reduced diameter upper end 44 thereof, also takes up the thrust of the central output shaft 21.

When a section of the cam plate, or flexible diaphragm is elevated from the nominal flat position shown in Figure 1, to one of the adjusted positions shown in Figure 3, the pivoted forked lever 33 attached to the tubular input shaft 19, follows the movement of the cam plate or flexible diaphragm 23, in order to maintain continuous contact between the follower roller 38 and the bottom surface of the cam plate or flexible diaphragm 23, regardless of the adjusted position of the flexible diaphragm.

A plate 46 attached to the lower end of the pivoted forked lever 33, has a stepped substantially cylindrical pin 47 attached thereto and depending therefrom, the stepped cylindrical pin being substantially perpendicular to the plate 46 and the pivoted forked lever 33.

Another long cylindrical pin 48 is pressed through the longitudinal axis of the central cylindrical output shaft 21, in a direction substantially perpendicular to the longitudinal axis of the central cylindrical shaft, as shown in Figure 1, and in section in Figure 6, the outer portions of the cylindrical pin passing through a pair of radially positioned diametrically opposite slots 49 through the tubular input shaft 19, the long cylindrical pin 48 engaging the lower end of the stepped cylindrical pin 47 depending from the plate 46, in order to rotate the central output shaft 21 through an angle directly proportional to the angular displacement of the forked pivoted lever 33, which is controlled by the vertical displacement of the corresponding section of the cam plate, or flexible diaphragm, in the manner hereinbefore described.

An offset plate bracket 51 is attached to the hub of the tubular input shaft 19 in the position shown in Figures 1 and 15. A coiled tension spring 52 is interposed between the plate bracket 51 and the pin 48 inserted through the central output shaft 21, a loop 52*a* at one end of the tension spring being fitted around the projecting pin 48, thereby continuously forcing the projecting cylindrical pin 48 into engagement with the stepped cylindrical pin 47 attached to the plate 46, thereby causing the central output shaft 21 to follow the angular movement of the pivoted fork lever 33. The tension spring 52 therefore tends to maintain the required relation between the central cylindrical output shaft 21 and the tubular input shaft 19 at all times.

In this manner, the central output shaft is rotated through an angle relative to the tubular input shaft, thus producing an angular adjustment between the central concentric input and output shafts, coordinated with the displacement of the cam plate or flexible diaphragm 23, at any angular position of the central concentric shafts 19 and 21.

A substantially circular separator plate 32 is located between the tubular upper section 54 and the mating lower section 54*a* of the housing, the separator plate being fixedly attached to the two housing sections 54 and 54*a*.

A planetary support disc 55 is fitted to a counterbore 56 in the separator plate 32, the planetary support disc 55 supporting a plurality of planetary gears in a manner hereinafter described in greater detail.

A planetary support disc positioning gear 57, consisting of a spur gear 57*a*, and a long tubular extension 58, integral with the spur gear, is located on the longitudinal centerline of the housing, the lower end of the tubular extension 58 being fitted through an opening 59 through the center of the planetary support disc 55, the end of the tubular extension being welded 60, or otherwise fixedly attached to the planetary support disc 55, thus enabling the planetary support disc 55 and the planetary gears supported thereby to be rotated into various angular positions, in substantial alignment with the individual adjusting screws 27, 27*a*, and the adjusting screw drive pinions 61, 61*a*, threadably fitted to the individual adjusting screws 27, 27*a*, in a manner hereinafter described in greater detail.

The upper end of the planetary disc positioning gear 57 has a circular counterbore formed therein, a shouldered ball bearing 62 being fitted to the circular counterbore. A tubular extension 63 integral with the tubular input shaft 19 and co-axial therewith, extends upward beyond the separator plate 32, the tubular extension being rotatably supported by a pair of anti-friction bearings, including the upper ball bearing 62, and a lower shouldered ball bearing 64, which is fitted to a hub at the center of the separator plate 32.

A long cylindrical pin 65, having a pair of lands 66, 66*a* integral therewith, is slidably fitted to the tubular extension 63 of the tubular input shaft, the reciprocating pin 65 having a pair of substantially hemispherical tips 65*a*, 65*b*, at the ends thereof, the reciprocating pin 65 being adapted to transmit the angular position of the pivoted upper arm 39, to a gear sector 67 and a vernier indicator sector 68, located adjacent the inner cover 69, which is fitted to the upper section 54 of the housing 17, in a manner hereinafter described in greater detail.

The lower hemispherical tip 65*b* of the reciprocating pin 65 engages a ledge 39a at the inner end of the pivoted short arm 39, shown in Figure 1, the ledge being located substantially at the vertical centerline of the housing of the cam compensator unit.

The upper hemispherical tip 65a of the cylindrical pin 65 engages a short cantilever diaphragm 70, which is integral with the lower end of a short pivoted lever 71, which is pivotally supported by pivot pin 72 fitted to a short bracket 73, located at the left-hand side of the cam compensator unit, under the general area of the opening 74 through the inner cover 69.

The upper end of the pivoted short lever 71 has a substantially cylindrical pin 75 fixedly attached thereto, the pin projecting beyond the upper surface of the pivoted short lever 71. The pin 75 is located a short distance from the pivot pin 72 and positioned in a plane substantially perpendicular to a plane through the upper face of the short pivoted lever 71.

An angularly positioned headless adjusting screw 76, which is treadably fitted to the outer end of the pivoted short lever 71, engages the upper surface of the cantilever diaphragm 70, thus enabling the operator to adjust the spacing between the cantilever diaphragm and the upper surface of the ledge 39a of the pivoted short arm 39 to conform to the length and position of the reciprocating cylindrical pin 65.

Figure 13:
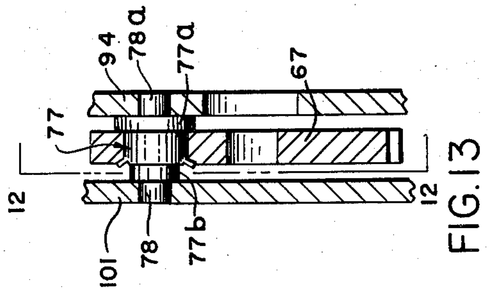
Figure 13 is a vertical section through the gear sector shown in Figure 12, the plates supporting it and the pivot shaft rotatably supported by the plates, the section being taken on the line 13—13, Figure 12.
Figure 12:
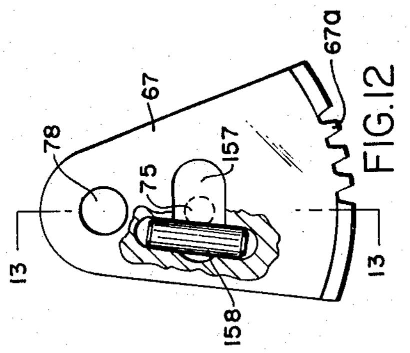

The gear sector 67, shown in Figures 12 and 13, which has a plurality of circumferential teeth around the outer circumference thereof, is rotatably supported by a short shaft 77 having a pair of reduced diameter cylindrical ends 78, 78a integral therewith, the reduced diameter cylindrical ends 78, 78a of the shaft being trunnioned in the upper and lower plates 101 and 94 and allowing the short shaft 77 with the gear sector 67 attached thereto to rotate freely.

A large substantially circular dial casing 79, the upper face 80 of the dial casing, which is graduated around its outer circumference, over its entire 360° range, with a series of numerals 81 indicating the angular positions at 15° intervals, each angular position numeral corresponding with the angular position of one of the adjusting screws 27, 27a relative to the horizontal axis of Figure 4, is located at the upper end of the upper section 54 of the housing. The dial casing 79 is rotated about the vertical axis of the housing sections 54, 54a to indicate the angular position of the graduations relative to the corresponding adjusting screws 27, 27a, in a manner hereinafter described. The dial casing 79 is fixedly attached to the planetary support disc 55, in a manner hereinafter described.

The dial casing 79 consists of a relatively thin-walled hollow body 82, of substantially circular cross-section, with the dial face 80 integral with the upper end of the circular body and substantially perpendicular thereto. The lower end of the circular body has a substantially circular flange 83 integral therewith, the flange 83 being attached to a mating flange 84, which is integral with a bracket 85, which is in turn spacedly located relative to and fixedly attached to the planetary support disc 55, the dial casing being rotated with the planetary support disc 55, when the planetary support disc is rotated by means of the Hermeflex transmission unit, in a manner hereinafter described in greater detail.

The lower end of the bracket 85 has a substantially circular base 86 integral therewith, the base being substantially parallel to and spacedly located relative to the planetary support disc 55, shown in Figure 1. The base 86 of the bracket attached to the dial casing is spacedly separated from the planetary support disc 55 by a plurality of spacers (not shown) and attached to the planetary support disc 55 by a plurality of screws, or other suitable attaching means (not shown).

The planetary gears which selectively drive the tubular pinions 61, 61a threadably fitted to each of the adjusting screws 27, 27a, are located between the base 86 of the bracket 85, and the upper surface of the planetary support disc 55, the base of the bracket being located a considerable distance above and substantially parallel to the face of the planetary support disc 55, as shown in Figure 1.

The inner cover 69 which has a substantially circular opening 74 therethrough, in substantially vertical alignment with the vernier indicator sector 68, is located above the substantially circular dial 80.

A transparent window 87 made of glass, or a transparent plastic material, is fitted through a substantially circular opening through the cover of an outer case 88, the cover 89 of the outer case, to which the window is fitted, being substantially parallel to and a short distance above the inner cover 69. The window 87 is in substantial alignment with the opening 74 through the inner cover, thus enabling the operator to observe the dial of the vernier 68 and the corresponding portion of the graduated dial 80 simultaneously.

The inner cover 69 is held in place at the top of the housing section 54 by an internally threaded cap 90, which is threadably attached to the external threads around the outer circumference of the open top of the housing section 54.

A short substantially cylindrical stub shaft 91, which is offset from and substantially parallel to the longitudinal axis of the concentric shafts 19, 21 is located below the inner cover 69, the reduced diameter upper end 92 of the stub shaft being supported by a small flanged ball bearing 93, which is fitted to the inner cover 69. The mating reduced diameter lower end 92a of the stub shaft 91, which is co-axial with the upper end 92 thereof, is supported by a mating ball bearing 93a, which is supported by a lower plate 94, which is in turn attached to the upper cover 69 of the housing 17.

A spur gear 95 is cut around the outer circumference of the lower portion of the stub shaft 91, the teeth of the spur gear 95 meshing with the teeth of the gear sector 67, which controls the rotation of the vernier indicator 68, which is located above the gear sector.

A tubular sleeve 96 is fitted to the stub shaft 91, above the spur gear 95, the vernier sector 68 being pressed on, or otherwise fixedly attached to the upper end of the tubular sleeve 96, thus synchronizing the rotation of the vernier sector with the rotation of the gear stub shaft 91.

A narrow slot 97 is cut through the reduced diameter upper end 92 of the gear stub shaft 91. A helical coiled torsion spring 98, formed of wire of substantially rectangular cross-section, is fitted around the reduced diameter upper end of the gear stub shaft 91, the torsion spring being operative to rotate the gear stub shaft 91, with the vernier sector 68 attached thereto, thereby retaining the teeth on the outer circumference of the spur gear 95 in continuous positive engagement with the teeth 67a of the gear sector 67. An open dished cap 99, having a substantially circular flange 99a integral with the lower end thereof, is fitted around the torsion spring 98, the flat flange 99a of the dished cap being attached to the upper surface of the inner cover 69 of the housing.

A short substantially cylindrical spacer 100 is located between the plates 94, 101, the reduced diameter upper end 102 of the spacer being fitted to the upper plate 101, which is substantially parallel to the lower plate 94, the corresponding reduced diameter lower end 102a of the cylindrical spacer being fitted to the lower plate 94, the shoulders adjacent the upper and lower ends of the cylindrical spacer separating and relatively locating the upper and lower plates 101, 94, respectively.

The interior of the tubular spacer 100 is internally threaded, a fillister head or other type of screw 103 being threadably fitted to the internal threads in the tubular spacer.

The head 103a of the screw 103 clamps the flange of the short bracket 73 to the lower plate 94, thereby supporting the short bracket 73.

As shown in Figures 1 and 5, the initial adjustment of the flexible cam diaphragm 23 may be effected by the rotation of each of the adjusting screws 27, **27*a*, which may be manually controlled by means of a spanner nut 105 which is threadably fitted to the upper end of each of the adjusting screws 27, 27*a*, each spanner nut having a pair of diametrically opposite spanner slots cut into the outer circumference of the upper flange 105*a*** thereof, to enable a spanner wrench (not shown) to rotate the selected adjusting screw to the required vertical position relative to the pinion fitted to the adjusting screw.

A mating substantially cylindrical spanner lock nut 106 is threadably fitted to each adjusting screw 27, **27*a*, the cylindrical body of the cylindrical spanner lock nut engaging the adjacent surface of the body of the spanner nut 105, to positively locate and lock the spanner nut 105** on each adjusting screw.

In the arrangement shown in Figure 1, the flanges of the spanner nuts 105, and the spanner locknuts 106 are alternately positioned, as indicated in the arrangement shown at the left and right-hand sides, Figure 1. In the arrangement shown at the left-hand side, Figure 1, the flanges **105*a*, 106*a* of the two spanner nuts abut one another. The spanner nuts fitted to the adjacent adjusting screws are arranged in the manner shown at the right-hand side, Figure 1, the faces of the cylindrical portions of the spanner nuts abutting one another, with the flanges 105*a*, 106*a* spacedly located relative to one another, to enable the abutting flanges 105*a*, 106*a* shown at the left-hand side, Figure 1, to fit between the separated flanges 105*a*, 106*a* shown at the right-hand side. With the close radial spacing between the adjusting screws 27, 27*a* shown in Figure 5, the flanges 105*a*, 106*a* of the spanner nuts fitted to adjoining adjusting screws 27, 27*a*, overlap one another, as shown in Figure 5, thus necessitating the flange arrangement shown at the left and right-hand sides, Figure 1, in order to clear the flanges of adjoining pairs of spanner nuts 105, 106**.

A tubular drive pinion 61, **61*a* is threadably fitted to each adjusting screw, above the separator plate 32, each tubular drive pinion 61, 61*a* comprising an internally threaded pinion 107, 107*a*, having an internally threaded tubular extension 108 integral with the lower end thereof, the tubular extension being threadably fitted to the mating adjusting screw 27, 27*a*. A short similar tubular extension 109 is integral with the upper end of each tubular pinion 107, the tubular extension being threadably fitted to the adjusting screw 27, 27*a***.

The lower extension 108 of each tubular pinion 61, **61*a* is trunnioned in a mating opening in the separator plate 32, thus enabling the tubular pinion 107 proper to be rotated by the planetary gear train shown in Figures 1 and 5, in a manner hereinafter described, thereby elevating and lowering the selected adjusting screws 27, 27*a*, in order to adjust the cam diaphragm 23**, in the manner hereinafter described.

The upper tubular extension 109 of the tubular drive pinion 61, which is axially aligned with the lower tubular extension 108 thereof, is trunnioned in an annular plate 110, which is fitted to the interior of the upper section 54 of the housing, in a position spacedly located relative to and substantially parallel to the separator plate 32, which is located between the upper and lower sections 54, **54*a*** of the housing.

The annular plate 110 is located in substantial alignment with the base 86 of the bracket 85, shown in Figure 1, the plate surrounding the base 86 of the bracket.

A tubular central planetary gear 111, is fitted around the depending tubular extension 58 of the planetary disc positioning gear 57, the central planetary gear being trunnioned on a pair of tubular bushings 112, **112*a*, which are fixedly attached to the interior of the central planetary cluster gear, each bushing having an integral flange, which longitudinally locates the cluster gear relative to the tubular extension of the planetary disc positioning gear 57, to which the bushings 112, 112*a*** are fitted.

The central planetary cluster gear 111 comprises a spur drive gear 114, which meshes with a tubular drive pinion 115, which is fixedly attached to the lower end of the lower or driven Hermeflex shaft 116, in the position shown in Figure 1, and a planetary drive gear 117, which is co-axial with the spur drive gear 114, the planetary drive gear 117 being located between the base 86 of the bracket 85 and the upper surface of the planetary support disc 55. A tubular spacer section which is integral with the drive gears 114 and 117 separates the drive gears 114 and 117 and axially aligns them relative to one another.

An intermediate planetary pinion 118, which is co-axial with the lower, driven Hermeflex shaft, is located adjacent the central planetary gear 111, the spur pinion **118*a*, which is located between the base 86 of the bracket 85 and the planetary support disc 55, meshing with the planetary drive gear 117 at the lower end of the central planetary cluster gear 111**.

The lower end of the intermediate planetary pinion 118, has a cylindrical extension 119 integral therewith, the cylindrical extension being trunnioned in the planetary support disc 55. A mating cylindrical upper extension 120, co-axial with the intermediate planetary pinion 118, is located above the pinion proper **118*a*, the upper extension being trunnioned in the circular base 86 of the bracket. As the intermediate planetary pinion 118 is simultaneously trunnioned in the base 86 of the bracket 85 and the planetary support disc 55, the intermediate planetary pinion 118 is rotated with the planetary support disc 55 and the base 86 of the bracket 85, when the planetary pinion is rotatably adjusted by means of the Hermeflex transmission unit 125** hereinafter described in greater detail.

A frusto-conical seat 113 is formed in the upper end of the intermediate planetary pinion 118, the frusto-conical seat 113, which is co-axial with the longitudinal axis of the intermediate planetary pinion 118, being operative to receive the frusto-conical lower end 122 of the lower or driven shaft of the Hermeflex transmission unit.

In addition to the frusto-conical seat 113 in the center of the intermediate planetary pinion 118, a plurality of equally-spaced radially positioned frusto-conical seats 121 is cut into the upper surface of the substantially circular base 86 of the bracket 85, as shown in Figures 1 and 5, the radial distance between the vertical axis of the housing 17 and the center of the frusto-conical seats 121 in the base 86 of the bracket, being substantially equal to the distance between the vertical axis of the housing and the axis of the intermediate planetary pinion 118.

The frusto-conical seats 121 in the base 86 of the bracket 85, are adapted to receive the frusto-conical lower end 122 of the lower, or driven shaft 116 of the Hermeflex transmission unit, in substantially the same manner as the frusto-conical seat 113 in the intermediate planetary pinion 118.

Thus, at any angular position of the planetary support disc 55, relative to the vertical axis of the lower and upper shafts 116, 129 of the Hermeflex transmission unit, corresponding to the radial position of one of the frusto-conical seats 121 in the base 86 of the bracket 85, the frusto-conical lower end of the lower, or driven shaft 116 of the Hermeflex transmission unit may be seated in one of the frusto-conical seats 121 in the base 86 of the bracket 85.

This enables the Hermeflex transmission unit to be lowered to substantially the position shown in Figure 1, at any rotational angular position of the planetary support disc 55 and the dial casing 79, which is supported by the planetary support disc 55, corresponding to the angular position of one of the frusto-conical seats 121 in the base 86 of the bracket 85. This enables an internally threaded cap 145 threadably attached to the tubular neck 130 integral with the outer cover 89 to be fitted to the tubular neck of the outer cover in substantially the position shown in Figure 1.

An auxiliary planetary pinion 123 is located between the intermediate planetary pinion 118 and the tubular drive pinions 61, 61*a* fitted to the adjusting screws 27, 27*a*. The auxiliary planetary pinion 123 includes a spur pinion 123*a* and a pair of small cylindrical integral stub shafts 124, 124*a*, located at the upper and lower ends of the spur pinion, the stub shafts being trunnioned in the circular base 86 of the bracket 85 and the planetary support disc 55, respectively.

The tubular drive pinion 115, which is fitted to the lower end of the Hermeflex driven shaft 116, comprises a spur pinion 115*a*, which meshes selectively with the central planetary gear 114, and the gear 57*a*, integral with the central planetary support disc positioning gear 57, depending upon whether the Hermeflex transmission unit 125 is in its lower position, shown in Figure 1, or in its upper elevated position shown in Figure 3.

The tubular drive pinion has a long tubular extension 126 integral therewith, the tubular extension 126 being fitted to the lower end of the lower, or driven shaft 116 of the Hermeflex transmission unit, the tubular extension being attached to the lower driven Hermeflex shaft by means of a pin 127, or other suitable attaching means.

When the control handle 128 attached to the upper, or drive shaft 129 of the Hermeflex transmission unit 125 is elevated to the disc adjusting position, shown in Figure 3, the Hermeflex transmission unit 125 is elevated from the position shown in Figure 1, to the adjusting position shown in Figure 3, the tubular pinion 115*a* meshing with the planetary disc positioning gear 57*a*.

When the control handle is rotated in the manner hereinafter described, the planetary support disc 55 and the planetary gears 57, 118, 123 attached thereto are rotated into a position, in which the intermediate planetary pinion 118 and the auxiliary planetary pinion 123 are aligned with one of the selected tubular drive pinions 61, 61*a*, fitted to the selected adjusting screws 27, 27*a*, located at the angular position at which the annular cam diaphragm 23 is to be adjusted, to provide an adjustment between the central cylindrical output shaft 21 and the outer tubular input shaft 19.

After the planetary pinions 118, 123 are aligned with the axis of the selected adjusting screw 27, 27*a*, the Hermeflex transmission unit is again lowered to the adjusting position shown in Figure 1, the control handle 128 being rotated in the required direction to either elevate or lower the adjusting screw 27, 27*a*, depending upon whether the particular portion of the flexible cam diaphragm 23 is to be raised or lowered.

In this position, shown in Figure 1, when the handle 128 attached to the upper or drive shaft 129 of the Hermeflex transmission unit is rotated, the tubular pinion 115, attached to the lower end of the Hermeflex driven shaft 116, rotates the central planetary drive gear 111, the lower gear 117 of which rotates the intermediate planetary pinion 118, which in turn rotates the auxiliary planetary pinion 123, which rotates the tubular drive pinion 61 threadably fitted to the selected adjusting screw 27, 27*a* thereby elevating or lowering the adjusting screw, and elevating or lowering the corresponding portion of the flexible cam diaphragm to one of the adjusting position shown in Figure 3, thus controlling the adjustment of the relation between the output and input shafts 21, 19, while at the same time rotating the indicating vernier sector to the corresponding angular position, to indicate the variation in angular position between the central output shaft 21 and the tubular input shaft 19, the angle indicator scale on the upper flange of the dial casing 79 indicating the angular position of the adjusting screw 27, 27*a*, about the axis of the housing 17, at which the adjusted position of the flexible diaphragm 23 is to be determined.

After the adjustment of the flexible cam diaphragm at the selected angular position is completed, the control handle 128 attached to the drive shaft of the Hermeflex transmission unit, is again lifted, thereby raising the Hermeflex transmission unit to the position shown in Figure 3, and placing the teeth of the tubular pinion 115*a* in mesh with the teeth of the central planetary disc positioning gear 57*a*, thus enabling the planetary support disc 55 with the planetary gears supported thereby, to be rotated to a position at which the intermediate planetary pinion 118, and the auxiliary planetary pinion 123 are in alignment with the axis of another adjusting screw 27*a*, the auxiliary planetary pinion 123*a* meshing with the tubular adjusting screw pinion 107.

By again rotating the control handle 128, while the Hermeflex transmission unit is in the lower position, shown in Figure 1, the aligned adjusting screw 27*a* is elevated or lowered, thereby raising or lowering another portion of the flexible cam diaphragm 23, while at the same time moving the vernier indicator sector 68 to the required angular position to indicate the extent of the angular variation between the central cylindrical output shaft 21 and the tubular input shaft 19, in the manner shown in Figure 1, and hereinbefore described.

An outer cover 89 having a circular opening therethrough, to which a transparent plastic window 87 is fitted, is attached to the outer casing 88, the outer cover having a tubular neck 130 of circular cross-section integral therewith, and projecting upward therefrom, the upper portion of the outer wall of the tubular neck being externally threaded 131, a relatively thin top wall 132 integral with the tubular neck, the top wall having a central opening therethrough, being provided at the upper end of the tubular neck.

The vertical axis 133 of the tubular neck 130 is offset relative to the axis of the housing 17, the vertical axis of the tubular neck, which is substantially co-axial with that of the Hermeflex transmission unit 125, and the lower or driven shaft 116 thereof, being co-axial with the axis of the intermediate planetary pinion 118, shown in Figure 1, and the frusto-conical seat 113 thereof.

The lower end of the Hermeflex transmission unit 125 is supported by a bottom wall 135 integral with and substantially parallel to the lower cover 69, which is supported by the upper housing section 54, an integral vertical wall 136 connecting the lower cover 69 with the bottom wall 135 thereof.

A flat substantially circular plate 137, having a circular opening 137*a* through the center thereof, is fitted to a circular pilot 138 at the upper end of the Hermeflex transmission unit 125.

A set of tubular corrugated bellows 140, of substantially circular cross-sectional contour, is fitted to the interior of the tubular neck section 130, of the outer cover, the bellows surrounding the cylindrical outer case 141*a* of the Hermeflex transmission unit.

A thin circular rim 142*a*, integral with the circumferential inner edge of a relatively flat flange 142, which is integral with the upper end of the tubular bellows 140, is fixedly attached to the outer circumference of the circular plate 137, which is attached to the upper end of the Hermeflex transmission unit, by soldering, brazing, or other suitable attaching means. A substantially parallel circular flange 143 integral with the lower end of the bellows 140, is similarly fixedly attached to the bottom surface of the outer cover 89 of the outer case, the flange supporting and aligning the bellows 140 relative to the outer casing of the Hermeflex transmission unit.

A coiled circular compression spring 144 is fitted around the tubular housing 141*a* of the Hermeflex transmission unit, the upper coil of the compression spring engaging the bottom surface of the circular plate 137, supporting and centering the Hermeflex transmission unit relative to the axis of the tubular neck 130, the bottom coil of the compression spring engaging the upper surface of the inner cover 69, thus enabling the compression spring to retain the Hermeflex transmission unit, and the control handle attached to the upper or drive shaft thereof, in the position shown in Figure 1, until the control handle is elevated in a manner hereinafter described.

A hollow dished cap 145 of substantially circular cross-section, the lower end of the tubular body 145*a* of which is internally threaded, is threadably attached to the externally threaded circular wall of the tubular neck section 130, which is integral with the cover of the outer case, thereby enclosing the operating mechanism, in the position shown in Figure 1.

In order to adjust the vertical position of any of the adjusting screws 27, 27*a*, from the position shown in Figure 1, during the process of adjusting the position of the corresponding portion of the flexible cam diaphragm, the hollow dished cap 145 is removed from the external threads surrounding the neck section 130 of the outer cover, thereby exposing the Hermeflex transmission unit 125 and the handle attached to the upper end of the drive shaft 129 thereof.

After the hollow dished cap 145 is removed, the control handle 128, which is adjustably attached to the upper drive shaft 129 of the Hermeflex transmission unit, may be manually elevated from the position shown in Figure 1, to the adjusting position shown in Figure 3, thereby enabling the planetary support disc 55, and the planetary pinions supported thereby, to be rotated into one of the flexible diaphragm adjusting positions, such as that shown in Figure 1, the dial casing 79 being simultaneously rotated, so that the angular position of the adjusting screw appears on the circular dial of indicator unit, in the manner hereinbefore described.

The Hermeflex transmission unit 125, shown in Figure 1, has an upper drive shaft 129 attached to the upper end thereof, the upper drive shaft 129 being co-axial with the circular bellows 141 and the lower or driven shaft 116 of the Hermeflex unit, as shown in Figure 1.

The upper end of the Hermeflex drive shaft 129 has a substantially cylindrical hub 147 fixedly attached thereto, the hub having a circular flange 147*a* integral with the lower end thereof.

The Hermeflex transmission unit 125, shown in Figures 1 and 19, is similar to that shown in Patent No. 2,454,340, issued to Wladimir A. Reichel, on November 23, 1948, and assigned to the same assignee as the present invention.

The Hermeflex transmission unit covered by the above patent, which is essentially the same as that shown in Figures 1 and 19, is utilized to transmit from one shaft, which is essentially the drive shaft 129, shown in Figure 1, to another shaft, which is the lower or driven shaft 116, shown in Figure 1, the rotational movement of the drive shaft being transmitted to the driven shaft, by an internally mounted pivotally supported shaft 148 supported within the interior of the Hermeflex transmission unit, as shown in Figure 19.

The corrugated bellows 141 shown in Figure 19, which are soldered, brazed, or otherwise fixedly attached to a circular disc attached to one end of the shaft 148, and a cylindrical support, which supports the pivot of the shaft 148, of the modified Hermeflex transmission unit shown in Figure 19, seal the interior of the Hermeflex transmission unit, so that the operating mechanism thereof is protected from the atmosphere, in the manner shown in Figure 19.

A substantially cylindrical pin 149, in alignment with the vertical axis of the drive shaft 129 and substantially perpendicular thereto, is pressed through the central cylindrical hub 147 and the Hermeflex drive shaft 129, to fixedly attach the central cylindrical hub to the drive shaft and align the central cylindrical hub 147 relative to the drive shaft, in substantially the position shown in Figure 1.

The cylindrical hub 147 has a plurality of frusto-conical radially positioned countersinks 150 around the outer circumference thereof, the countersinks 150, 150*a* of each pair, being diametrically opposite one another, the countersinks 150, 150*a* being adapted to selectively receive a pair of spherical balls 151, 151*a* slidably fitted to the cylindrical sections 152, 152*a* of the control handle 128, in a manner hereinafter described.

The control handle proper comprises a pair of diametrically opposite cylindrical sections 152, 152*a*, which are substantially co-axial with the frusto-conical countersinks 150, 150*a* through the central hub 147. Each cylindrical section 152, 152*a* of the control handle, has a central substantially cylindrical passage 153, 153*a* therethrough, a ball 151, 151*a* being slidably fiitted to the inner end of each of the cylindrical passages.

Each of the cylindrical passages has a coiled compression spring 154, 154*a* slidably fitted thereto, the inner end of each compression spring being adapted to engage the corresponding ball 151, 151*a*, thereby forcing the ball toward the outer circumference of the central hub 147, into one of the frusto-conical countersinks 150, 150*a* therein.

The outer end of each of the cylindrical passages 153, 153*a*, which is internally threaded, has a hollow hexagon, or other type of cylindrical plug 155, 155*a* threadably fitted thereto, the cylindrical plug being adapted to engage the outer end of the coiled compression spring 154, 154*a* in order to force the coiled compression spring 154, 154*a* against the ball 151, 151*a*.

A substantially circular flat washer 156, is fitted to the upper drive shaft 129 of the Hermeflex transmission unit, the washer engaging the upper surface of the central hub 147, and clearing the outer edge of the cylindrical handle sections 152, 152*a*, thereby aligning the cylindrical handle sections 152, 152*a*, between the lower flange 147*a* of the central cylindrical hub 147, and the washer, thus permitting the cylindrical handle sections 152, 152*a* to be rotated around the central hub 147.

The compression springs 154, 154*a* fitted to the cylindrical passages 153, 153*a* through the cylindrical handle sections 152, 152*a*, enable the control handle 128 to be rotatably angularly shifted from an angular position in alignment with one pair of diametrically opposite frusto-conical countersinks 150, 150*a* in the central hub 147, to another angular position in alignment with another pair of diametrically opposite countersinks 150, 150*a* around the central hub 147.

The short substantially vertical stub shaft 91 located at the pivot center of the vernier indicator sector 68, has a small pinion 95 integral with the lower end thereof, the pinion meshing with the teeth around the outer circumference of the gear sector 67.

A parallel-faced slot 157 through the central portion of the gear sector 67, between the pivot center and the toothed outer circumference thereof, is in alignment with the cylindrical pin 75 projecting beyond the upper surface of the pivoted arm 71, with which the auxiliary cantilever diaphragm 70 is integral.

Another cylindrical pin 158 substantially parallel to the upper and lower surfaces of the gear sector, is inserted into the gear sector 67, between the upper and lower surfaces thereof, the pin 158 straddling the slot 157 through the gear sector 67, and being operative to engage the adjacent surface of the pin 75 projecting beyond the pivoted arm 71.

When the pivoted arm 71 is angularly displaced by the movement of the auxiliary cantilever diaphragm 70, integral with the pivoted arm 71, or by the movement of the reciprocating central pin 65, the pin 75 attached to the upper surface of the pivoted arm is similarly angularly displaced, thereby moving the gear sector 67 through a similar angle about its axis of rotation.

The angular movement of the pinion shaft 91, under control of the torsion spring 98 attached to the upper end of the shaft, rotates the stub shaft 91 and the pinion 95 integral therewith, through a small angle, so that the teeth of the pinion 95 are held in line contact with the circumferential teeth around the gear sector 67 with which it meshes.

The control handle 128 and the drive shaft 129 of the Hermeflex transmission unit 125 to which it is attached, are rotated until the adjusting screw 27, which is aligned with the axis of the Hermeflex driven shaft is elevated or lowered to the required adjusted position of the flexible diaphragm 23, in the same manner as that hereinbefore described, the angular relation between the vernier sector 68 and the circular graduated dial 80 designating the angular variation of the central cylindrical output shaft 21 relative to the tubular input shaft 19.

A substantially cylindrical central hub 147 having a plurality of radially positioned countersinks 150, **150*a* around the outer circumference thereof, is pinned to the upper end of the upper Hermeflex drive shaft 129, a circular flange 147*a* being formed around the bottom surface of the cylindrical hub, the face of the flange being substantially perpendicular to the axis of the cylindrical hub. A thin substantially circular washer 156 is attached to the upper surface of the hub, substantially parallel to the flange 147*a***.

The control handle 128, trunnioned on the central hub, is located between the lower flange of the central hub and the flat washer attached to the upper end of the central hub. Each cylindrical section 152 of the control handle has a substantially cylindrical central passage therethrough, the central cylindrical passages through the two cylindrical handle sections 152, **152*a*** being diametrically aligned with one another.

A spherical ball 151, **151*a*, which fits into one of the frusto-conical countersinks 150, 150*a* in the outer circumference of the central hub, is fitted to the inner end of each of the cylindrical central passages, a coiled compression spring 154, 154*a* being mounted in each of the central passages, the compression spring 154, 154*a* forcing the spherical ball 151, 151*a* into the open end of the countersink 150, 150*a* in the central hub, a cylindrical plug 155, 155*a* threadably fitted to the outer end of each cylindrical passage being provided to compress the compression spring 154, 154*a* and force the spherical ball 151, 151*a* into engagement with the mating radially positioned frusto-conical countersink in the central hub 147**.

This enables the control handle 128 to be angularly shifted from an angular position in line with one pair of frusto-conical countersinks 150, **150*a*, around the central hub, to another angular position in line with any other pair of diametrically aligned frusto-conical countersinks 150, 150*a*, around the central hub 147**.

At the center of rotation of the adjustment and vernier sector 68, a short distance from the centerline of the circular indicator ring 80, a short stub shaft 91 is mounted, the stub shaft being substantially parallel to the longitudinal axis of the housing 17. The stub shaft is rotatably supported by a pair of ball bearings 93, **93*a*. A cylindrical extension 92 of relatively small diameter projects beyond the upper end of the stub shaft, the extension having a central parallel-faced slot 97 therethrough, which receives and supports one end of a coiled torsion spring 98, the outer end of which is fixedly attached to a thin dished cap 99, the circular flange of which is attached to the upper surface of the cover 69 of the upper housing section 54**.

The lower end of the stub shaft has a small spur pinion 95 integral therewith, the spur pinion meshing with the circumferential teeth formed around the outer circumference of a narrow circular segmental gear sector 67 pivotally supported by the housing cover.

The central portion of the gear sector 67 is in substantial alignment with the pin 75 affixed to the upper end of the pivoted lever, with which the reciprocating pin positioned auxiliary diaphragm 70 is integral. Another cylindrical pin 158 substantially perpendicular to the pin 75 attached to the pivoted lever, is inserted into the gear sector 67, the cylindrical pin engaging the outer circumference of the nominally substantially vertical pin 75 attached to the pivoted lever.

When the pivoted lever 71 is controlled by the upward or downward angular movement of the auxiliary cantilever diaphragm 70, integral therewith, the pin 75 attached thereto is moved through a similar angle, thereby moving the gear sector 67 through a corresponding angle about its axis of rotation.

The rotational angular movement of the pinion shaft 91 by means of the torsion spring 98 attached to the upper end thereof, rotates the shaft 91 and the pinion 95 integral therewith, through a small angle, so that the teeth of the pinion 95 are held in line contact with the teeth of the gear sector 67, with which it meshes.

The maximum variation of angular position between the central cylindrical output shaft 21 and the tubular input shaft 19 is a total of 5° in either direction.

This represents the maximum angular differential between the two concentric shafts 21, 19, which is indicated by the vernier sector 68 shown in Figures 1 and 4.

In order to avoid excessive loads and the setting up of excessive stresses in the flexible diaphragm 23, shown in Figures 1 and 9, the maximum movement of the flexible diaphragm, between each pair of adjusting screws 27, **27*a***, is limited to the equivalent of 1° angular shaft differential in either direction.

This operating limit avoids the setting up of extreme stresses in the flexible diaphragm 23, and also avoids excessive loads on the adjusting screws 27, **27*a***, the root diameter of which is extremely small.

While the maximum adjustment of the flexible diaphragm, between each pair of adjusting screws, is limited to the equivalent of a rotational angular shaft variation of 1°, in each direction, the total accumulated rotational angular variation between the central cylindrical shaft 21 and the tubular output shaft 19 is limited to 5° maximum, in either direction.

Thus, where the variations in flexible diaphragm position are continued in one direction, they may be accumulated up to a maximum limitation of the equivalent of an angular differential of 5°, in either direction, so that when a variation which is the equivalent of an angular differential of 5° is reached, between one of the adjusting screws 27, and an adjusting screw **27*a*** located near it, the direction of the flexible diaphragm movement, at the following adjusting screw, must either be held constant at the equivalent of an angular differential of 5°, or any other established maximum, or the diaphragm adjustment may be reversed. The limiting range of the equivalent of an angular differential of 1° between successive adjusting screws must be maintained, so that after reaching the equivalent of an angular differential of 5° as a maximum, the subsequent readings may be reversed, thereby reducing them to the equivalent of 0° to 5°; the total limiting range of angular displacement being held to a maximum, which is the equivalent of an angular differential between shafts of 5° as hereinbefore described.

The bottom cover 18 of the housing is attached to the lower housing section **54*a* by a plurality of headed screws 160, 160*a*, the threaded upper end of some of the screws 160 being fitted to a plurality of bosses 161, integral with the upper section 54 of the housing, the bosses 161, which are integral with the outer wall of the housing and project inward therefrom, being substantially parallel to the central separator plate 32** thereof.

The screws 160, **160*a*, which pass through the separator plate 32, between the upper and lower sections 54, 54*a* of the housing, are threadably fitted to the annular plate 110 fitted to the interior of the housing section 54, thereby spacedly locating the annular plate 110 relative to the separator plate 32**.

The other clamp screws 162 which pass through a circular flange surrounding the bottom cover 18, are threadably fitted to the separator plate 32, the upper end of the clamp screws being threadably fitted to the annular plate 110, thereby supporting the annular plate 110, and spacedly locating the annular plate 110 relative to the separator plate 32.

Figure 19 shows a modification of the Hermeflex transmission unit and bellows construction shown in Figure 1. In the modified construction, the Hermeflex transmission assembly 125 and the cylindrical shafts 129, 116, at both ends thereof, are substantially the same as those shown in Figure 1.

The tubular flexible bellows 164 surrounding a portion of the Hermeflex transmission assembly is similar to that shown in Figure 1.

A tubular adapter ring 165 is attached to the upper end of the Hermeflex transmission assembly, the central hub of the tubular adapter ring being soldered, or otherwise fixedly attached to the cylindrical support 166 of the Hermeflex transmission assembly.

A substantially straight tubular section 167, integral with the convolutions 168 at the upper end of the tubular bellows 164, is fitted to the outer circumference of a circular flange 165*a*, integral with the tubular adapter ring 165.

A substantially circular support flange 169 is attached to the lower end of the tubular bellows, the flat circular section 169*a* of the support flange being removably attached to the outer cover 89 of the housing by a plurality of screws 170, or other suitable attaching means.

A bead 171 of arcuate cross-sectional form is formed around the central opening through the flange 169, an extension 172 of the lower convolution of the bellows being spun around the bead 171, in the manner shown in Figure 19, the extension 172 being spun around the bead 171, and soldered, brazed or otherwise fixedly attached thereto, in the manner shown in Figure 19.

Before the modified bellows 164 are mounted in the unit, such as that shown in Figure 1, the extension 172 at the lower end of the bellows 164, is spun around the beaded portion of the flange 169 and soldered, or otherwise fixedly attached thereto.

The adapter ring 165 at the upper end of the bellows is attached to the cylindrical support 166 of the Hermeflex transmission unit, and soldered, or otherwise fixedly attached thereto. The straight tubular section 167 at the upper end of the bellows is fitted to the outer circumference of the circular flange 165*a* of the adapter ring 165.

After the upper portion of the corrugated bellows 165 is attached to the Hermeflex transmission assembly 125, the Hermeflex transmission assembly, with the corrugated bellows 164 attached thereto, is inserted into the mounted position, which is substantially the same as that shown in Figure 1, the circular flange 169, attached to the lower end of the tubular corrugated bellows, being moved into the position shown in Figure 19, in engagement with the inner face of the outer cover.

The screws 170 provided to clamp the circular bellows flange 169 to the outer cover of the housing are threadably fitted to the outer cover of the housing in the position shown in Figure 19, thereby attaching the bellows assembly to the cam compensator unit in substantially the position shown in Figure 19.

In the modified construction shown in Figure 19, the compression spring 144 shown in Figure 1, which is utilized for retaining the corrugated tubular bellows in the expanded position, shown in Figures 1 and 19, is eliminated, thereby enabling the inner diameter of the tubular bellows to be reduced, over that shown in Figure 1. In this construction shown in Figure 19, the material of which the corrugated bellows 164 are made would be somewhat heavier and of a somewhat higher strength and degree of elasticity than that shown in Figure 1, thus enabling the convolutions 168 of the bellows to expand in a longitudinal direction, and in that manner enabling the compression spring 144 to be eliminated, without effecting the functioning of the tubular bellows unit.

It will be apparent to those skilled in the art, that the present invention is not limited to the specific details described above and shown in the drawings, and that various further modifications are possible in carrying out the features of the invention and the operation and the method of support, mounting adjustment, actuation and utilization thereof, without departing from the spirit and scope of the appended claims.

What it claimed is:

1. A device for adjusting the rotational angular relation between two substantially concentric shafts, comprising a hollow housing having a cover attached to one end thereof, a tubular shaft trunnioned in the cover attached to the hollow housing, a substantially cylindrical shaft rotatably fitted to the tubular shaft, co-axially therewith, a plurality of radially positioned adjusting screws supported within the housing, the axes of said adjusting screws being substantially parallel to the axis of rotation of the concentric shafts, each of said adjusting screws having a diaphragm support channel attached to the end thereof directed toward the concentric shafts, a relatively thin annular flexible diaphragm supported by the diaphragm support channel, the flexible diaphragm being aligned with and nominally perpendicular to the adjusting screws, a pinion threadably fitted to each of the adjusting screws, means pivotally supported by one of the concentric shafts adapted to engage the flexible diaphragm to transmit the adjusted position of the diaphragm to the central cylindrical shaft, means attached to the central cylindrical shaft adapted to engage the pivoted transmittal means to rotate the central cylindrical shaft, coordinated with the adjusted position of the flexible diaphragm, at a point in substantial alignment with any of the adjusting screws, manually controllable means adapted to selectively engage the pinion fitted to one of the adjusting screws to rotate the pinion, and in that manner longitudinally displace the individual adjusting screw, thereby to adjust the relation of the portion of the flexible diaphragm located adjacent the individual adjusting screw, relative to the nominal position thereof and flexible seal means surrounding the manual adjustment means, adapted to seal the manual adjustment means and the interior of the housing.

2. A device for adjusting the rotational angular relation between two substantially concentric shafts, comprising a hollow housing, a cover attached to one end of the housing, a tubular shaft trunnioned in the cover, a substantially cylindrical shaft rotatably fitted to the tubular shaft, co-axially therewith, a plurality of radially positioned adjusting screws supported within the housing, the axes of said adjusting screws being substantially parallel to the axis of rotation of the concentric shafts, each of said adjusting screws having a diaphragm support channel attached to the end thereof directed toward the concentric shafts, an annular flexible diaphragm supported by the diaphragm support channels, the flexible diaphragm being aligned with and nominally perpendicular to the adjusting screws, means pivotally supported by one of the concentric shafts, adapted to engage the flexible diaphragm to transmit the adjusted position of the flexible diaphragm to the central cylindrical shaft, means attached to the central cylindrical shaft adapted to engage the pivoted transmittal means to rotate the central cylindrical shaft, coordinated with the adjusted position of a portion of the diaphragm, at a point in substantial alignment with any of the adjusting screws, an internally threaded pinion threadably fitted to each of the adjusting screws, manually controllable means adapted to selectively engage the pinion fitted to one of the individual adjusting screws to rotate the pinion and in that manner longitudinally adjust the individual adjusting screw, thereby to adjust the relation of the portion of the flexible diaphragm adjacent the individual adjusting screw to the nominal position thereof, flexible seal means surrounding the manual adjustment means adapted to seal the manual adjustment means and the interior of the housing, indicator means operatively connected to the manual adjustment means adapted to indicate the selected adjusting screw which has been adjusted, and means controlled by the pivoted diaphragm position transmittal means, adapted to indicate the variation in the adjusted position of the portion of the flexible diaphragm aligned with any of the adjusting screws, relative to the nominal position thereof, thereby to indicate the variation in rotational angular position between one of the concentric shafts and the other.

3. A device for adjusting the rotational angular relation between two substantially concentric shafts, as in claim 2, in which the manually controllable means for rotating the pinion fitted to an individual adjusting screw, includes an internally sealed flexible adjustment unit having a drive shaft projecting beyond one end thereof, and a rotatable driven shaft, directly controlled by the drive shaft, projecting beyond the end of the flexible adjustment unit, directed toward the concentric shafts, a plate attached to the housing, co-axially therewith, a planetary gear support disc rotatably fitted to the plate, a planetary disc drive member attached to the planetary support disc, co-axially therewith, a planetary gear train supported by the planetary support disc adapted to rotate the pinion threadably fitted to one of the adjusting screws, when the planetary gear train is radially aligned with one of the adjusting screws, and means attached to the driven shaft of the flexible adjustment unit, adapted to engage the planetary disc drive member to rotate the planetary support disc to align the planetary gear train supported by the planetary support disc with the axis of one of the adjusting screws.

4. A device for adjusting the rotational angular relation between two substantially concentric shafts, as in claim 2, in which the manually controllable means for rotating the pinion fitted to an individual adjusting screw, includes an internally sealed flexible transmission unit having a drive shaft projecting beyond one end thereof, and a rotatable driven shaft, coupled to the drive shaft, projecting beyond the end of the flexible transmission unit directed toward the concentric shafts, a plate attached to the housing co-axially therewith, a planetary gear support disc rotatably fitted to the plate, a planetary disc drive gear attached to the planetary support disc, co-axially therewith, a planetary drive cluster gear mounted concentrically with the planetary disc drive gear, said planetary drive cluster gear including a drive gear located in substantial axial alignment with the planetary disc drive gear and spacedly located relative thereto, and a planetary drive gear concentric with the cluster gear drive gear and located adjacent the planetary support disc, a planetary gear train rotatably supported by the planetary support disc in operative alignment and meshing with the planetary drive gear, a pinion attached to the driven shaft of the flexible drive unit, adapted to selectively mesh with the planetary disc drive gear and the cluster gear drive gear, the pinion attached to the flexible transmission unit driven shaft being adapted to rotate the planetary support disc, to operatively align the planetary gear train with the axis of one of the adjusting screws in one operating position thereof, each of said internally threaded pinions fitted to each of the adjusting screws being adapted to selectively mesh with the planetary gear train, the planetary gear train being adapted to rotate the pinion fitted to one of the adjusting screws, thereby to axially move the adjusting screw, when the planetary gear train is in radial alignment with, and meshing with the internally threaded pinion fitted to one of the adjusting screws, under control of the pinion attached to the driven shaft of the flexible transmission unit.

5. A device for adjusting the rotational angular relation between two substantially concentric shafts, as in claim 2, in which the tubular outer shaft has a tubular extension integral therewith, the means pivotally supported by one of the concentric shafts being a lever pivotally supported by the tubular extension of the tubular shaft, the pivoted lever having a follower roller trunnioned on the end thereof opposite the pivoted end, the follower roller being adapted to engage the surface of the flexible diaphragm, opposite the surface in engagement with one of the adjusting screws, to transmit the adjusted position of the adjacent portion of the flexible diaphragm to the pivoted lever, the cylindrical shaft concentric with the tubular shaft, having a pin inserted therethrough, in substantial alignment with and substantially perpendicular to the axis of rotation of the cylindrical shaft, said pin extending through the tubular shaft, the tubular shaft having a pair of diametrically opposite slots therethrough to clear the projecting pin, the pivoted lever having a control pin fixedly attached thereto and depending therefrom, the control pin being in operative engagement with the pin extending through the cylindrical shaft, the control pin attached to the pivoted lever being adapted to engage the pin extending through the cylindrical shaft, thereby to rotate the cylindrical shaft, relative to the tubular shaft, co-ordinated with the adjusted angular position of the pivoted lever, and therefore the adjusted position of the displaced portion of the flexible diaphragm, which controls the angular position of the pivoted lever.

6. A device for adjusting the rotational angular relation between two substantially concentric shafts, comprising a hollow housing having a cover attached to one end thereof, a substantially tubular outer shaft trunnioned in the cover of the hollow housing, co-axially with the housing, a substantially cylindrical shaft rotatably fitted to the tubular outer shaft, co-axially therewith, a plurality of equally-spaced, radially positioned adjusting screws supported within the housing, the axes of said adjusting screws being substantially parallel to the axis of rotation of the concentric shafts, each of said adjusting screws having a diaphragm support channel attached to the end thereof directed toward the concentric shafts, a substantially circular, relatively thin flexible diaphragm supported by the diaphragm support channels, the flexible diaphragm being radially aligned with and nominally perpendicular to the adjusting screws, means pivotally supported by one of the concentric shafts adapted to engage the flexible diaphragm to transmit the adjusted position of portions of the flexible diaphragm, located in substantial alignment with individual adjusting screws, to the central cylindrical shaft, a rotational adjustment control member, attached to the cylindrical shaft, projecting through the tubular outer shaft, means pivotally supported by the tubular outer shaft adapted to engage the control member attached to the cylindrical shaft to rotate the cylindrical shaft, co-ordinated with the adjusted position of a portion of the flexible diaphragm, at a point in substantial alignment with any of the adjusting screws, an internally threaded pinion threadably fitted to each of the adjusting screws, manually controllable means adapted to selectively engage the pinion fitted to one of the individual adjusting screws, to rotate the pinion and thereby longitudinally displace the individual adjusting screw, to which the pinion is fitted, thereby to adjust the relation of the portion of the flexible diaphragm, located adjacent the individual adjusting screw, relative to the nominal position thereof.

7. A device for adjusting the rotational angular relation between two substantially concentric shafts, as in claim 6, in which the tubular outer shaft has a tubular extension integral therewith, the means pivotally supported by the tubular outer shaft being a lever pivotally supported by the tubular extension of the tubular outer shaft, the pivoted lever having a follower roller trunnioned on the end thereof opposite the pivotally supported end, the follower roller being adapted to engage the surface of the flexible diaphragm, opposite the surface in engagement with one of the adjusting screws, to transmit the adjusted position of the adjacent portion of the flexible diaphragm to the pivoted lever, the manually controllable means for rotating the pinion fitted to an individual adjusting screw including an internally sealed flexible transmission unit having a drive shaft projecting beyond one end thereof, and a rotatable driven shaft directly coupled to the drive shaft, projecting beyond the end of the flexible transmission unit directed toward the concentric shafts within the housing, an intermediate plate attached to the housing, co-axially therewith, a planetary gear support disc rotatably fitted to the intermediate plate, a planetary support disc drive gear attached to the planetary support disc, co-axially therewith, a planetary drive cluster gear mounted concentrically with the planetary support disc drive gear, said planetary drive cluster gear including a cluster drive gear located in substantial axial alignment with the planetary support disc drive gear, and spacedly located relative thereto, and a planetary train drive gear concentric with the cluster gear drive gear, and located adjacent the planetary support disc, a planetary gear train rotatably supported by the planetary support disc in operative alignment and meshing with the planetary train drive gear, a pinion attached to the driven shaft of the flexible transmission unit adapted to selectively mesh with the planetary support disc drive gear, and the cluster drive gear, the flexible transmission unit being adapted to be longitudinally moved from a first position, in which the pinion attached to the driven shaft thereof is in operative alignment with and meshes with the planetary disc drive gear, to a second position in which the pinion is in operative alignment with, and meshes with the cluster drive, gear, the pinion attached to the flexible transmission unit driven shaft being adapted to rotate the planetary support disc to operatively align the planetary gear train with the axis of one of the adjusting screws in one operating position thereof, the internally threaded pinion, threadably fitted to each of the adjusting screws, being adapted to selectively mesh with the planetary gear train, the planetary gear train being adapted to rotate the pinion fitted to one of the adjusting screws, thereby to axially move the adjusting screw when the planetary gear train is in radial alignment with, and in mesh with the internally threaded pinion fitted to one of the adjusting screws, under control of the pinion attached to the driven shaft of the flexible transmission unit, the drive shaft of the flexible transmission unit having a control handle adjustably attached thereto, the control handle including a central hub attached to the drive shaft of the flexible transmission unit, a pair of diametrically opposite cylindrical sections mounted on opposite sides of the central hub and fitted thereto, the central hub having a plurality of radially positioned countersinks therein axial alignment with the cylindrical sections, each of the cylindrical sections of the control handle having a central opening therethrough, in substantial axial alignment with the countersinks around the central hub, each of said central openings through each cylindrical handle section having a spherical member slidably fitted thereto, adapted to selectively seat in one of the adjacent countersinks in the central hub, and compressible means adapted to urge the spherical members into the corresponding countersinks in the central hub, thereby to grip the central hub when the spherical members are aligned with one pair of countersinks therein, the cylindrical sections of the control handle being rotatably adjustable about the central hub thereof, thereby to vary the axial relation of the cylindrical sections relative to the central hub of the control handle.

8. A device for adjusting the rotational angular relation between two substantially concentric shafts, as in claim 6, in which the tubular outer shaft has a tubular extension integral therewith, the means pivotally supported by the tubular outer shaft being a lever pivotally supported by the extension of the tubular outer shaft, the pivoted lever having a follower roller trunnioned on the end thereof, opposite the pivoted end, the follower roller being adapted to engage the surface of the flexible diaphragm opposite the surface in engagement with one of the adjusting screws, to transmit the adjusted position of the adjacent portion of the flexible diaphragm to the pivoted lever, the cylindrical shaft having a substantially cylindrical pin inserted therethrough, in substantial alignment with the axis of rotation of the cylindrical shaft, and substantially perpendicular thereto, said cylindrical pin extending through the tubular outer shaft, the tubular outer shaft having a pair of diametrically opposite slots therethrough to clear the projecting cylindrical pin attached to the cylindrical shaft, the pivoted lever having a control pin fixedly attached thereto, and depending therefrom, the control pin being in operative engagement with the cylindrical pin extending through the cylindrical shaft, the control pin attached to the pivoted lever being adapted to engage the cylindrical pin inserted through the cylindrical shaft, thereby to rotate the cylindrical shaft, co-ordinated with the adjusted angular position of the pivoted lever, and therefore the adjusted position of the portion of the flexible diaphragm which controls the angular position of the pivoted lever, a bracket fixedly attached to the tubular extension of the tubular outer shaft, extending outward therefrom, and spring means incorporated between the bracket attached to the tubular extension of the tubular outer shaft, and the extension of the cylindrical pin inserted through the cylindrical shaft, and attached thereto, said spring means being adapted to urge the cylindrical pin inserted through the cylindrical shaft into continuous engagement with the projecting pin attached to the pivoted lever, to facilitate rotation of the cylindrical shaft, relative to the tubular outer shaft to which it is fitted.

9. A device for adjusting the rotational angular relation between two substantially concentric shafts, as in claim 6, in which the manually controllable means for rotating the selected pinion fitted to an individual adjusting screw, includes an externally sealed angularly universal transmission unit, having a rotatable drive shaft projecting beyond one end thereof, and a rotatable driven shaft directly coupled to the drive shaft, co-axially therewith, projecting beyond the end of the universal transmission unit directed toward the concentric shafts, the hollow housing having a cover fitted to the open end thereof, means integral with said cover adapted to axially slidably support the universal transmission unit, an outer housing having a relatively flat wall substantially parallel to the cover of the hollow housing and spacedly located relative thereto, a relatively flat plate attached to the universal transmission unit adjacent the drive shaft thereof, a tubular corrugated flexible bellows surrounding a portion of the universal transmission unit, substantially concentric therewith, the ends of the tubular bellows being respectively attached to the flat plate attached to the universal transmission unit, and the wall of the outer housing, to seal the interior of the outer housing, and spring means fitted to the outer diameter of the universal transmission unit, substantially concentrically with the tubular bellows, the tubular outer shaft having a tubular extension integral therewith, the means pivotally supported by the tubular outer shaft being a lever pivotally supported by the tubular extension of the tubular outer shaft, the pivoted lever having a follower roller trunnioned on the end thereof, opposite the pivotally suported end, the follower roller being adapted to engage the surface of the flexible diaphragm opposite the surface in engagement with one of the adjusting screws, to transmit the adjusted position of a portion of the flexible diaphragm to the pivoted lever, an intermediate plate attached to the hollow housing, co-axially therewith, a planetary gear support disc rotatably fitted to the intermediate plate, a planetary disc drive gear attached to the planetary support disc, co-axially therewith, a planetary drive cluster gear rotatably fitted to the planetary support disc drive gear, concentrically therewith, said planetary drive cluster gear including a cluster drive gear located in substantial alignment with the planetary support disc drive gear and spacedly located relative thereto, and a planetary train drive gear co-axial with the cluster drive gear, and located adjacent the planetary support disc, a planetary gear train rotatably supported by the planetary support disc, in operative alignment and meshing with the planetary train drive gear, a pinion attached to the driven shaft of the flexible transmission unit, concentrically therewith, adapted to selectively mesh with the planetary support disc drive gear, and the cluster drive gear, the universal transmission unit being adapted to be selectively manually displaced in a longitudinal direction, from a first position, in which the pinion attached to the driven shaft thereof is in operative alignment with and meshes with the planetary support disc drive gear, to a second position in which the pinion attached to the driven shaft of the universal transmission unit, is in operative alignment with, and meshes with the cluster drive gear, the spring means surrounding the universal transmission unit being adapted to normally urge the universal transmission unit, into a position in which the pinion attached to the driven shaft thereof, is in meshing engagement with the planetary support disc drive gear, the pinion attached to the driven shaft of the universal transmission unit being adapted to rotate the planetary support disc, to operatively align the planetary gear train with the axis of one of the adjusting screws, in one operating position thereof, the internally threaded pinion threadably fitted to each of the adjusting screws, being adapted to selectively mesh with the planetary gear train, the planetary gear train being adapted to rotate the pinion fitted to one of the adjusting screws, thereby to axially move the adjusting screw, when the planetary gear train is in axial alignment with, and in mesh with the internally threaded pinion fitted to one of the adjusting screws, under control of the pinion attached to the driven shaft of the universal transmission unit, the drive shaft of the universal transmission unit having a control handle adjustably attached thereto, the control handle having a central hub attached to the drive shaft of the universal transmission unit, a pair of diametrically opposite, substantially cylindrical sections mounted on opposite sides of the central hub and fitted thereto, the axes of the cylindrical sections being substantially perpendicular to the axis of the drive shaft, and means fitted to the cylindrical sections of the control handle, adapted to co-act with means formed in the central hub, to permit rotation of the cylindrical sections of the control handle relative to the central hub thereof, and to retain the cylindrical sections of the control handle in preselected radial positions relative to the central hub of the control handle.

References Cited in the file of this patent

UNITED STATES PATENTS 2,419,074 Herbert ---------------- Apr. 15, 1947
2,771,781 Von Ranson ----------- Nov. 27, 1956